(12) United States Patent
Twiss et al.

(10) Patent No.: US 12,508,303 B2
(45) Date of Patent: Dec. 30, 2025

(54) ACETYLATION OF MIRO1

(71) Applicant: University of South Carolina, Columbia, SC (US)

(72) Inventors: Jeffery L. Twiss, Columbia, SC (US); Amar N. Kar, Lexington, SC (US)

(73) Assignee: University of South Carolina, Columbia, SC (US)

( * ) Notice: Subject to any disclaimer, the term of this patent is extended or adjusted under 35 U.S.C. 154(b) by 174 days.

(21) Appl. No.: 17/188,139

(22) Filed: Mar. 1, 2021

(65) Prior Publication Data

US 2021/0330756 A1    Oct. 28, 2021

Related U.S. Application Data

(60) Provisional application No. 63/016,343, filed on Apr. 28, 2020.

(51) Int. Cl.
 A61K 38/46    (2006.01)
 A61K 31/437   (2006.01)
 C07K 16/40    (2006.01)

(52) U.S. Cl.
 CPC .......... *A61K 38/46* (2013.01); *A61K 31/437* (2013.01); *C07K 16/40* (2013.01); *C12Y 306/05* (2013.01)

(58) Field of Classification Search
 CPC ...... A61K 38/46; A61K 31/437; C07K 16/40; C07K 16/18; C07K 2317/34; C07K 16/44; C12Y 306/05
 See application file for complete search history.

(56) References Cited

PUBLICATIONS

UnitProt; https://www.uniprot.org/uniprotkb/Q8IXI2/entry; accessed Jul. 6, 2023 (Year: 2003).*
UniProt2; https://www.uniprot.org/uniprotkb/A0A024QZ26/entry; accessed Jul. 6, 2023 (Year: 2014).*
Kalinski, Ashley L., et al. "Deacetylation of Miro1 by HDAC6 blocks mitochondrial transport and mediates axon growth inhibition." Journal of Cell Biology 218.6 (2019): 1871-1890. (Year: 2019).*
Pleticha, Josef, et al. "Minimally invasive convection-enhanced delivery of biologics into dorsal root ganglia: validation in the pig model and prospective modeling in humans." Journal of neurosurgery 121.4 (2014): 851-858. (Year: 2014).*
Grant, P. Ellen, et al. "Analgesia after dorsal root ganglionic injection under CT-guidance in a patient with intractable phantom limb pain." Pain Medicine 24.9 (2023): 1122-1123. (Year: 2023).*
Weinert, Brian T., et al. "Proteome-wide mapping of the *Drosophila* acetylome demonstrates a high degree of conservation of lysine acetylation." Science signaling 4.183 (2011): ra48-ra48. (Year: 2011).*

* cited by examiner

*Primary Examiner* — Louise W Humphrey
*Assistant Examiner* — Candice Lee Swift
(74) *Attorney, Agent, or Firm* — Offit Kurman; Douglas L. Lineberry

(57) ABSTRACT

Deacetylation of rat Miro1 on Lysine 105 attenuates axon growth on nonpermissive substrates by making mitochondria more sensitive to Ca levels, depolarizing mitochondrial membranes and blocking mitochondrial transport; the current disclosure provides an antibody that specifically recognizes the lysine 105 acetylated and not the deacetylated Miro1 protein.

2 Claims, 11 Drawing Sheets

Specification includes a Sequence Listing.

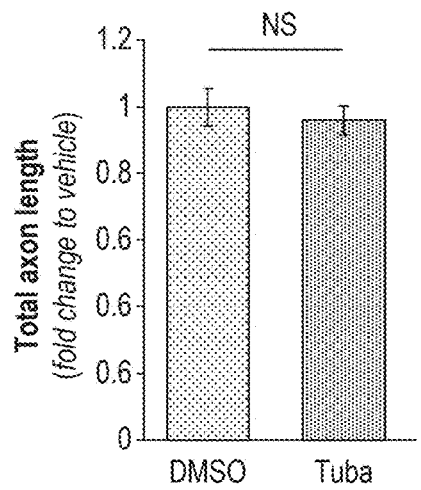
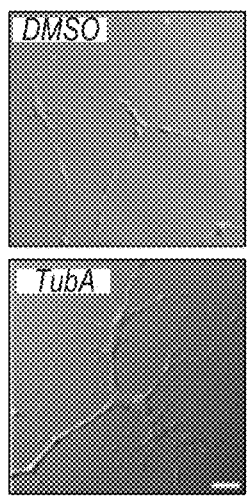
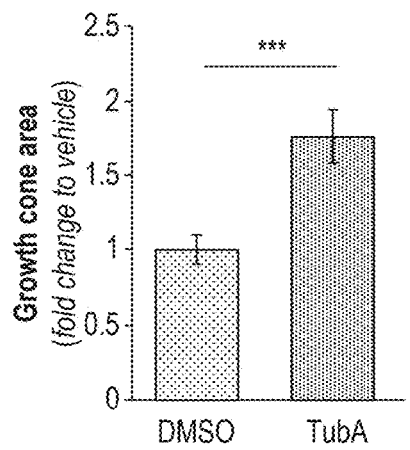
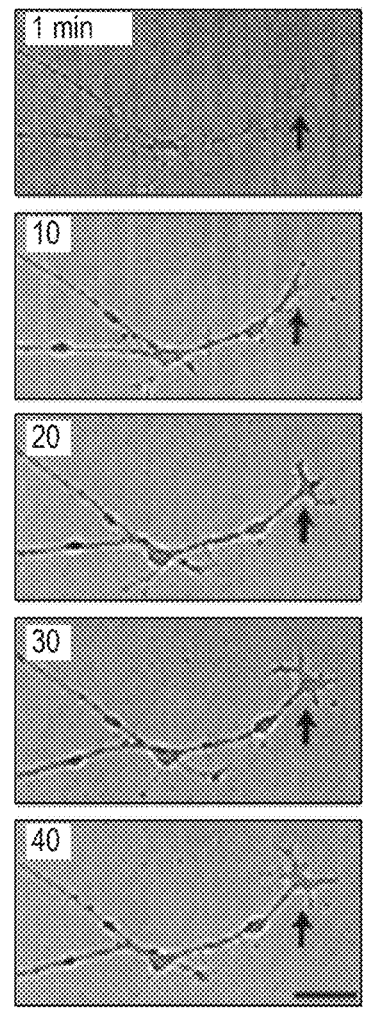
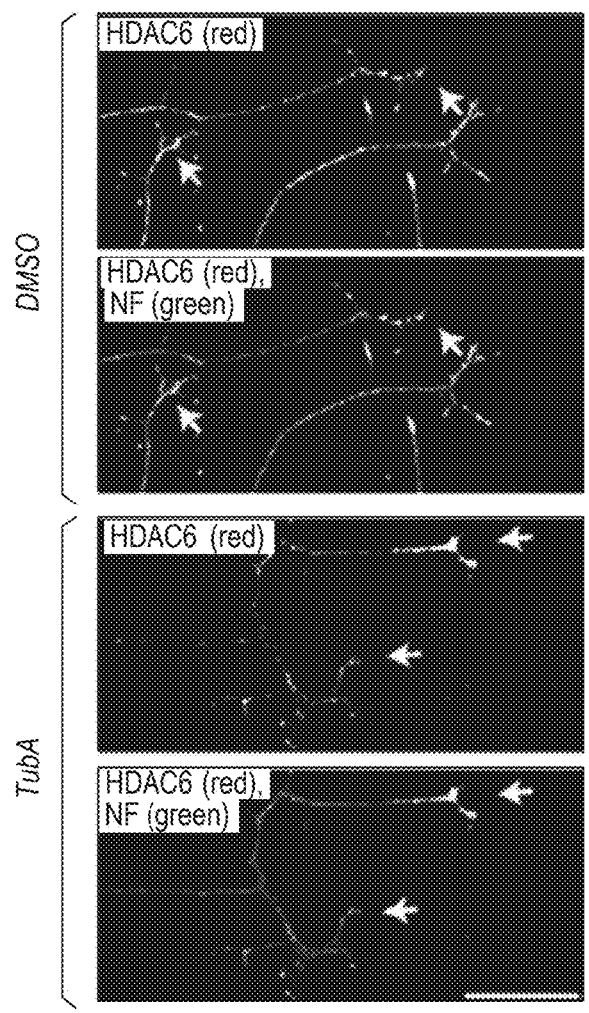
FIG. 1A  FIG. 1B  FIG. 1C
FIG. 1D  FIG. 1E

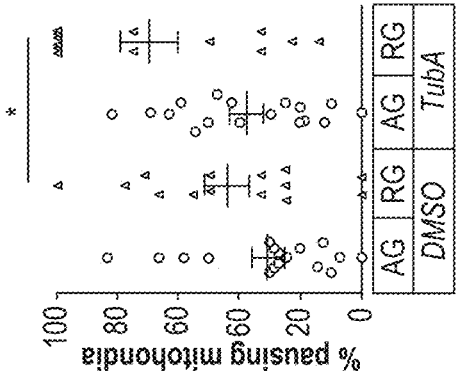
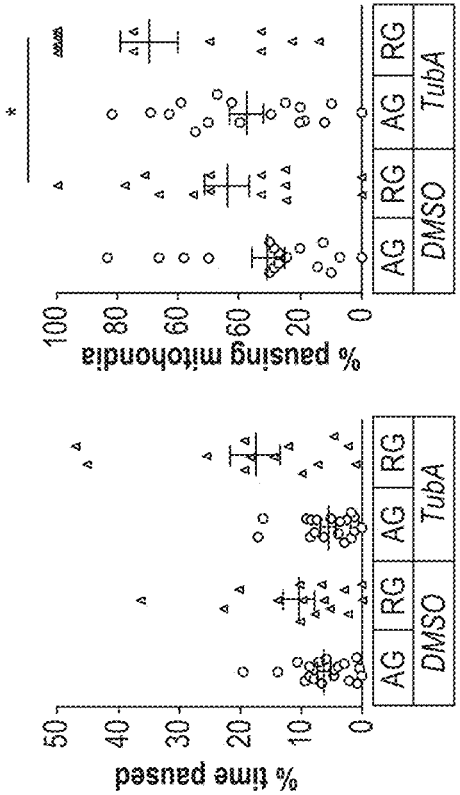
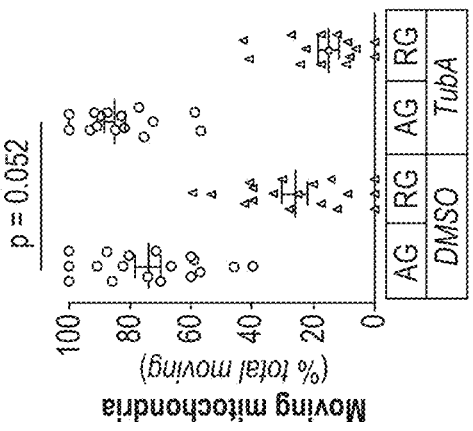
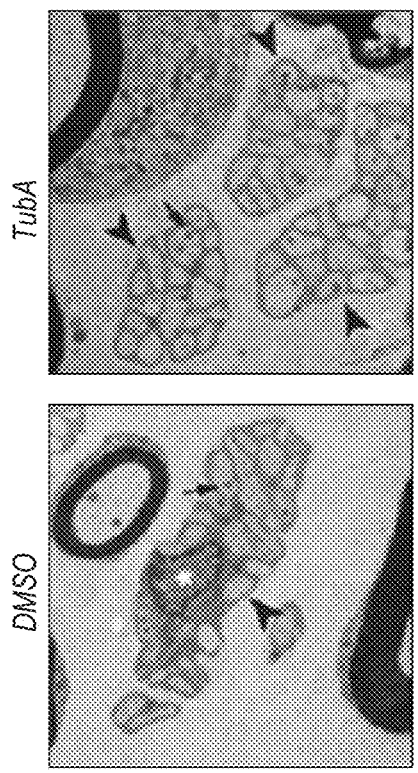
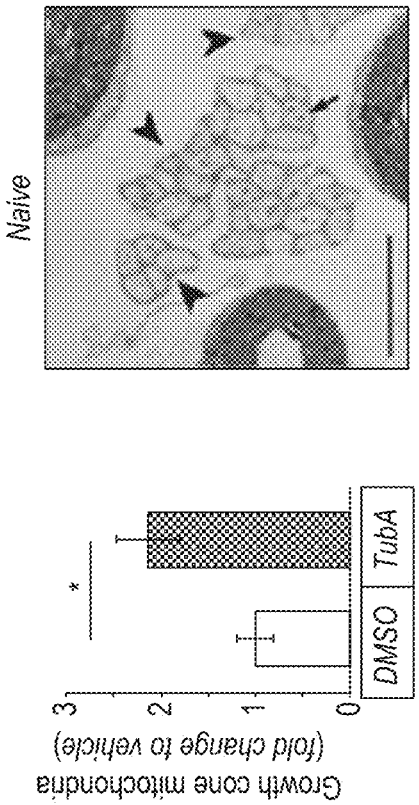
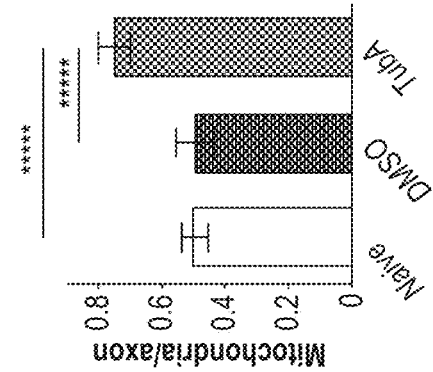

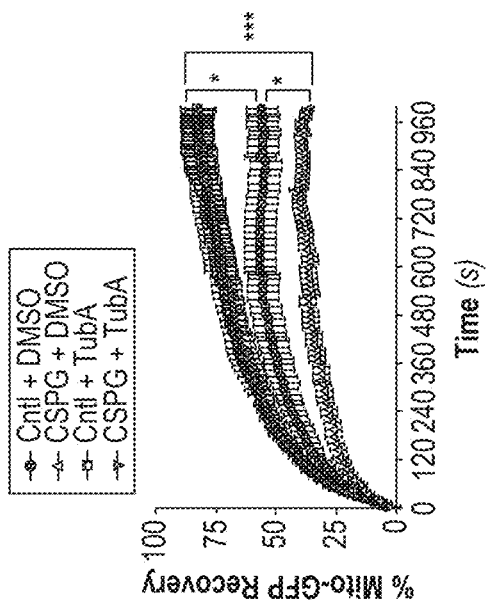
FIG. 4A
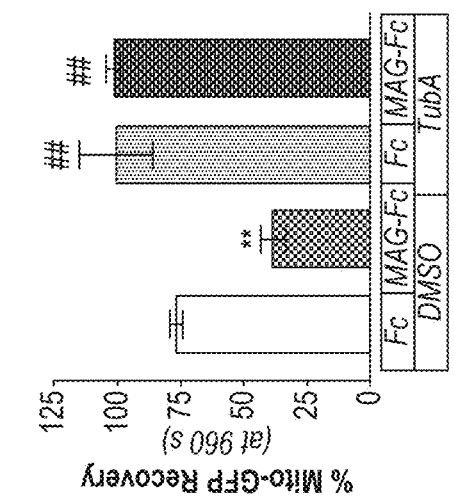
FIG. 4B
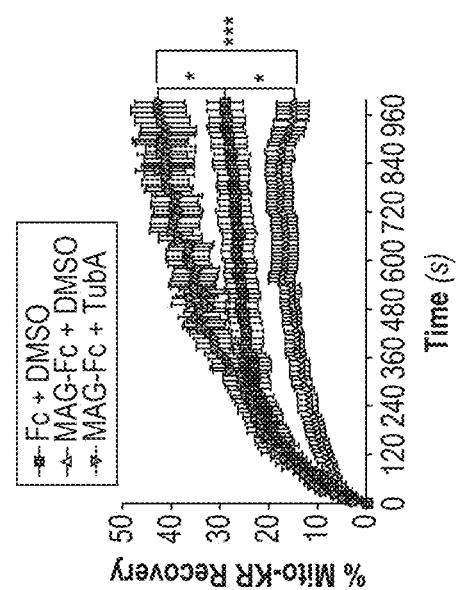
FIG. 4C
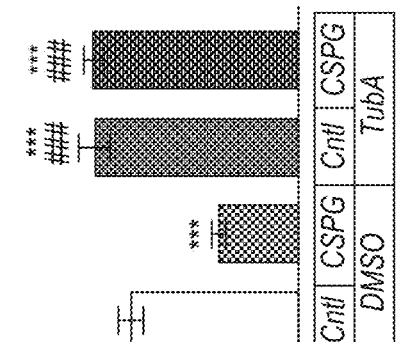
FIG. 4D
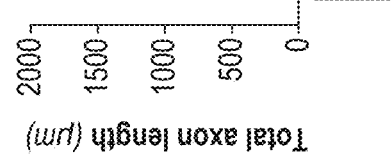
FIG. 4E
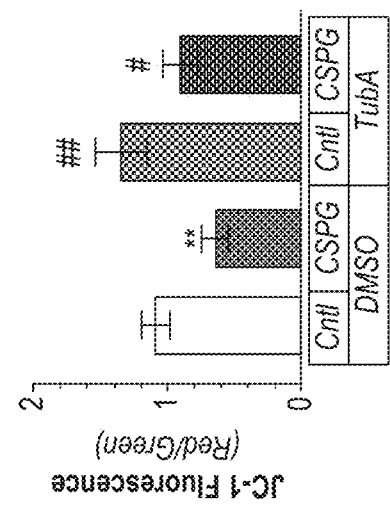
FIG. 4F
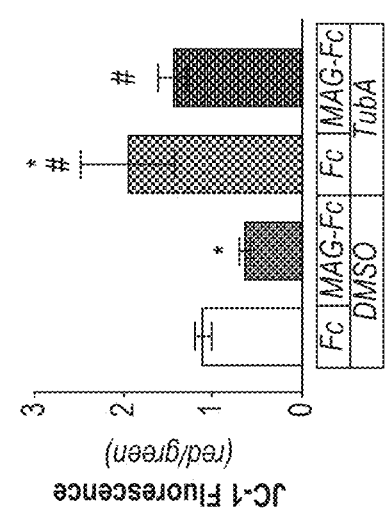

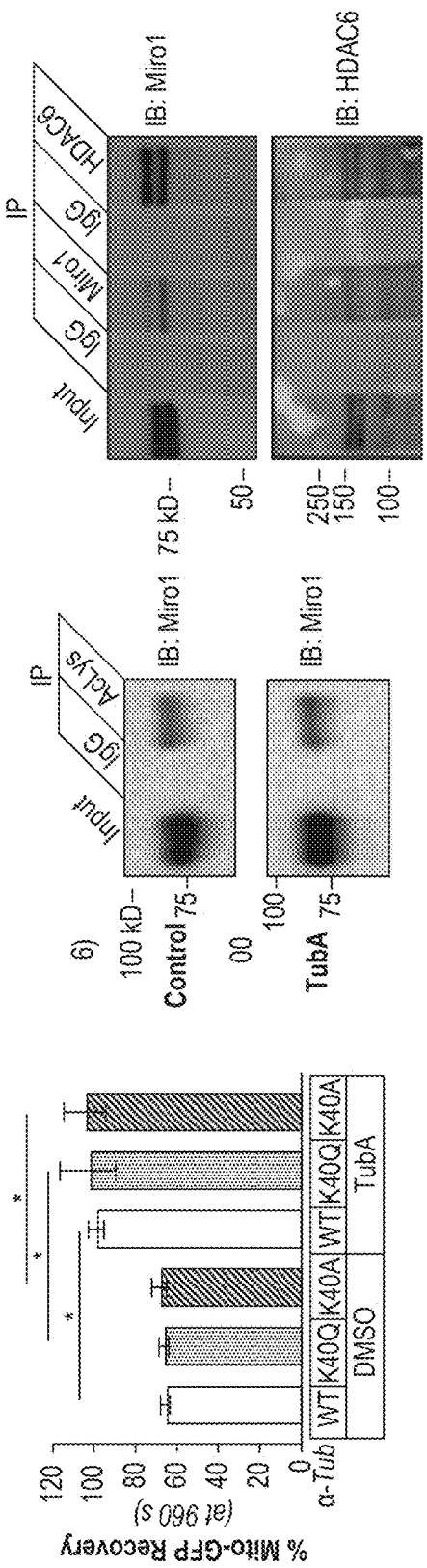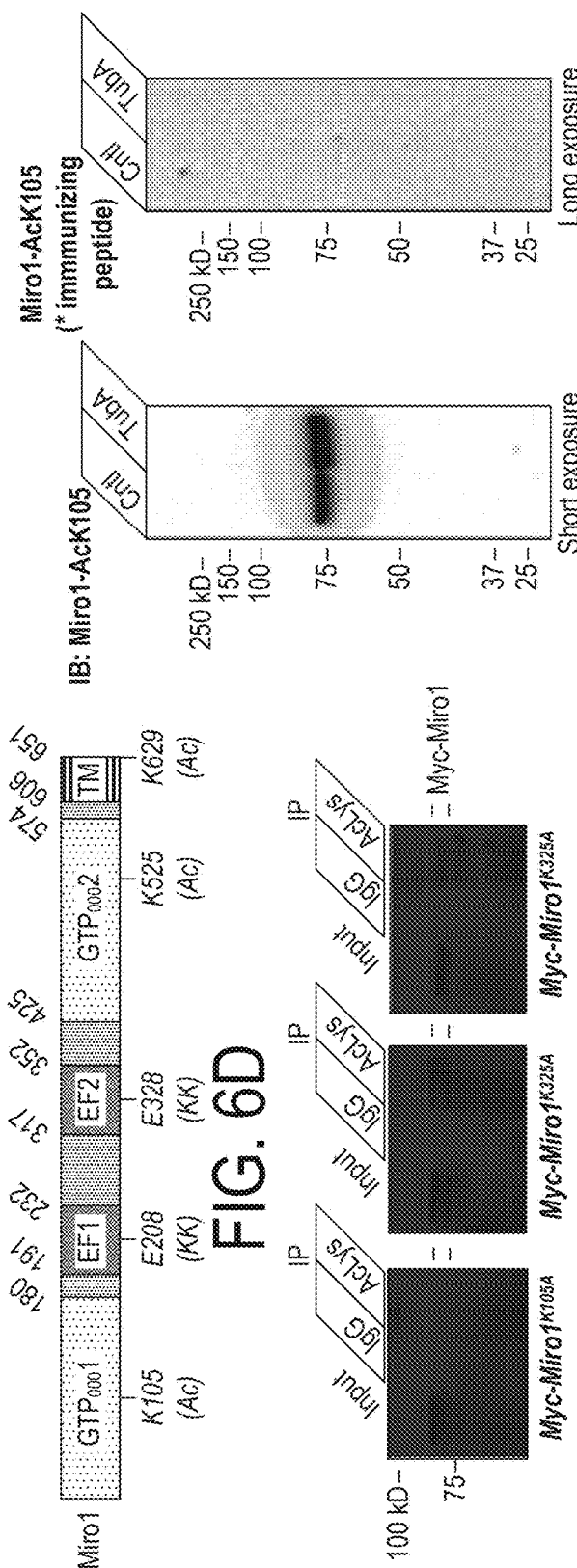
FIG. 6A FIG. 6B FIG. 6C FIG. 6D FIG. 6E FIG. 6F

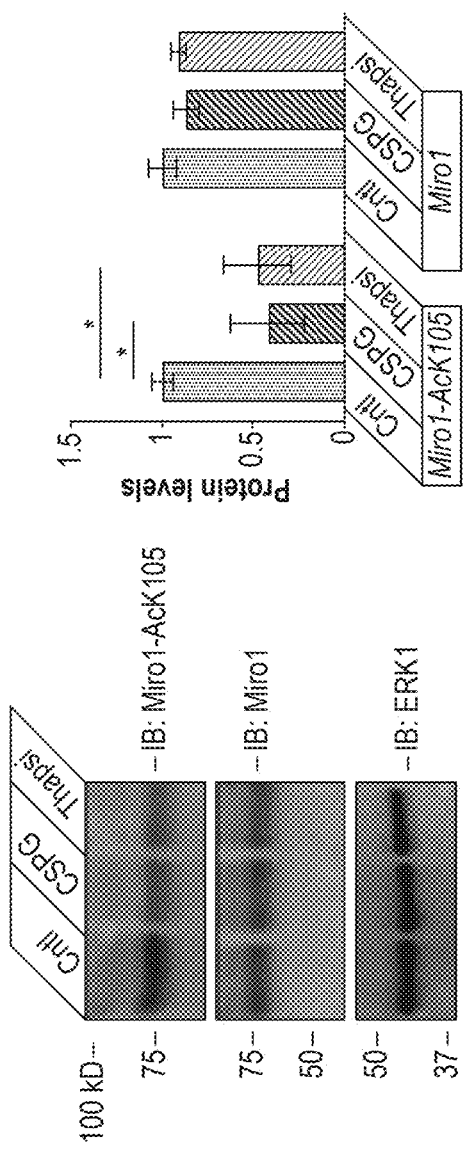
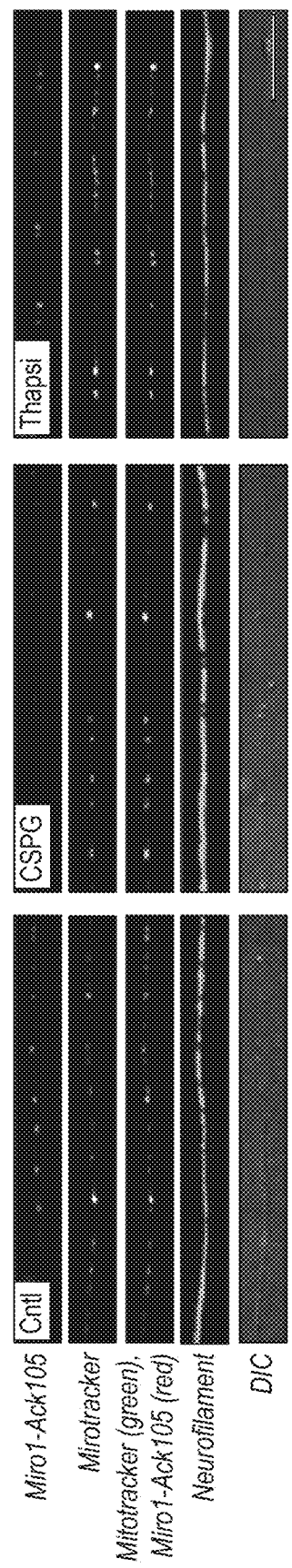
FIG. 6I
FIG. 6H
FIG. 6G
FIG. 6J

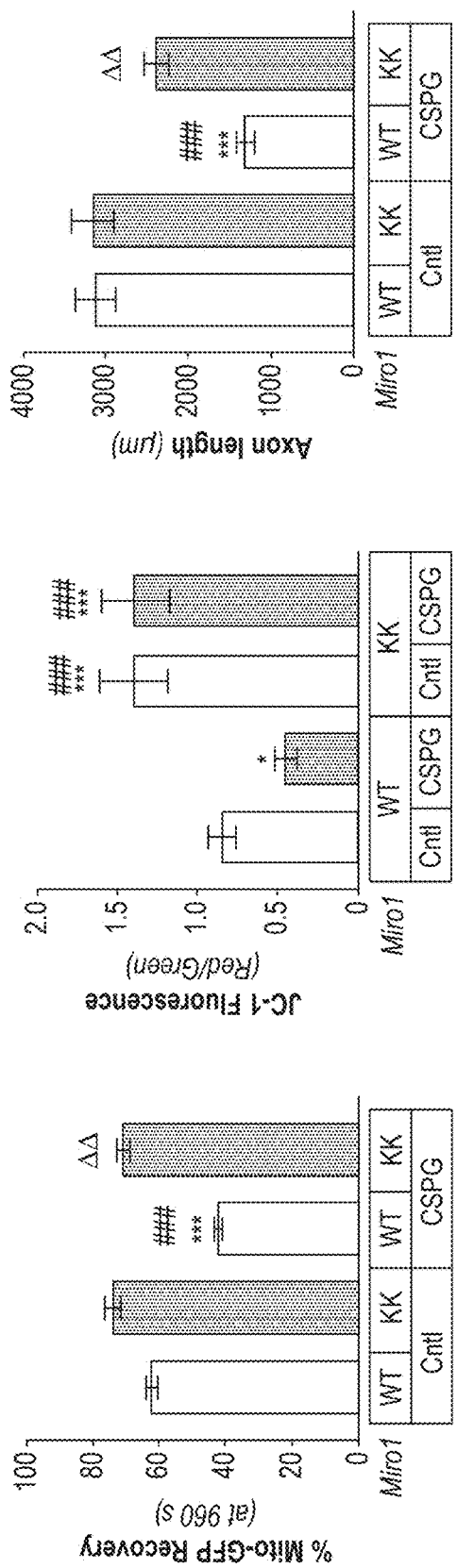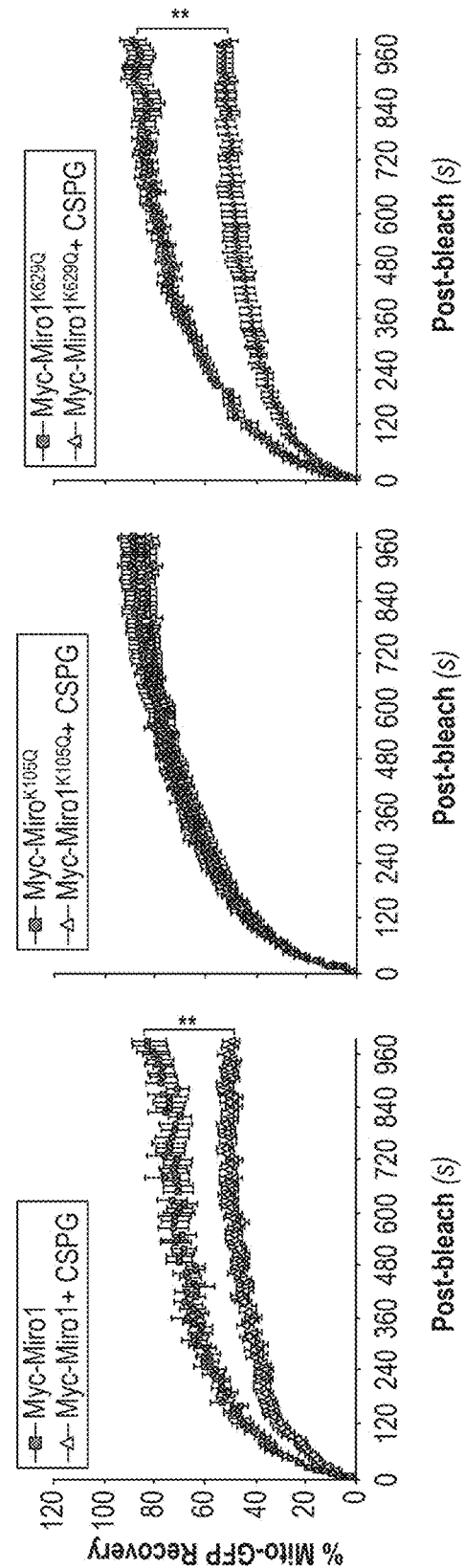

ACETYLATION OF MIRO1

STATEMENT REGARDING FEDERALLY SPONSORED RESEARCH

This invention was made with the government support under RO1 NS041596 awarded by National Institute of Health. The government has certain rights in the invention.

TECHNICAL FIELD

The subject matter disclosed herein is generally directed to antibodies that specifically detect acetylated Miro1.

BACKGROUND

Inhibitory proteins in the extracellular matrix and myelin of the central nervous system (CNS) have been implicated in failed axon regeneration after spinal cord injury and brain trauma. These CNS growth inhibitors include myelin-associated glycoprotein (MAG) and chondroitin sulfate proteoglycans (CSPGs), which share several signaling pathways including activation of the small G-protein RhoA, which in turn triggers actin depolymerization and growth cone collapse (Schweigreiter et al., 2004). Blocking activation of RhoA, inhibiting RhoA's downstream Rho-associated protein kinase (ROCK), and increasing intracellular cAMP levels have all been shown to overcome the growth inhibitory effects of these nonpermissive substrates (Cai et al., 2001; Fournier et al., 2003; Duffy et al., 2009; Joshi et al., 2015). These MAG and CSPG signaling pathways have been intensely investigated as potential targets to support neural repair in the CNS, but it is not entirely clear what regulatory proteins function downstream of MAG and CSPG beyond the effects of RhoA/ROCK on the axonal cytoskeleton.

Histone deacetylase 6 (HDAC6) was identified as a tubulin deacetylase, and HDAC6 knockout mice show hyperacetylation of α-tubulin (Zhang et al., 2008). Although better known for their nuclear functions, HDACs can function in the cytoplasm and target numerous proteins. Class II HDACs shuttle between the nucleus and cytoplasm (IIa includes HDACs 4, 5, 7, and 9, and IIb includes HDACs 6 and 10; Hubbert et al., 2002; Lahm et al., 2007). HDAC6 localizes into neuronal processes, and we previously showed that inhibition of HDAC6 supports axon growth on MAG and CSPGs (Rivieccio et al., 2009). α-Tubulin is a well-known substrate for HDAC6 (Hammond et al., 2008), and acetylation of α-tubulin is associated with more stable microtubules.

Stabilizing microtubules in the injured spinal cord has been shown to reduce axon degeneration, prevent end bulb formation typically seen in nonpermissive environments, and support axon regeneration (Hellal et al., 2011; Ruschel et al., 2015). We recently showed that MAG and CSPG decrease stability of α-tubulin acetyltransferase (αTAT), suggesting that the balance in activity of tubulin acetylating and deacetylating enzymes contributes to axon growth on nonpermissive substrates (Wong et al., 2018). However, HDAC6 obviously has other substrates in axons that could contribute to axon growth failure.

Accordingly, it is an object of the present invention to provide an antibody that specifically recognizes the lysine 105 acetylated and not the deacetylated Miro1 protein.

Citation or identification of any document in this application is not an admission that such a document is available as prior art to the present disclosure.

SUMMARY

The above objectives are accomplished according to the present disclosure by providing in a first embodiment a method for supporting axon growth. The method may include sustaining mitochondrial transport and mitochondrial membrane potential in the presence of CNS axon growth inhibitors via administering acetyl-Miro1 and inhibiting histone deacetylase 6 (HDAC6). Further, supporting axon growth may occur in adult dorsal root ganglion. Yet still, the method may inhibit histone deacetylase 6 (HDAC6) having Sequence Listing No. 1. Again, tubastatin (TubA) may be administered to inhibit HDAC6. Moreover, nerves treated via the method may show increased mitochondrial numbers in unmyelinated axons. Yet again, in nerves treated via the method a ratio of anterogradely to retrogradely moving axonal mitochondria increases. Further, the method may prevent decreased mitochondrial transport in axons caused by released Ca2+. Still again, Miro1 may comprise Sequence Listing No. 2.

In a further embodiment, a method for protecting axons from mitochondrial damage is provided. The method may include administering tubastatin (TubA) to axons and administration of TubA inhibits histone deacetylase 6 (HDAC6). Still, the protected axons may be distal axons. Further, the protected axons may be proximal axons. Yet again, treatment with TubA may expand growth size and alters mitochondrial transport. Still again, treated axons may show no growth cone retraction after treatment with TubA. Moreover, the method may cause increased anterograde movement of axonal mitochondria. Yet again, the method may prevent axon retraction and end bulb formation in distal axons. Further yet, the method may increase membrane potential in mitochondria of axons. Still again, the method may prevent decreased mitochondrial transport in axons caused by released Ca2+. Yet more, the method may acetylate Miro1 having Sequence Listing No. 2.

These and other aspects, objects, features, and advantages of the example embodiments will become apparent to those having ordinary skill in the art upon consideration of the following detailed description of example embodiments.

BRIEF DESCRIPTION OF THE DRAWINGS

An understanding of the features and advantages of the present disclosure will be obtained by reference to the following detailed description that sets forth illustrative embodiments, in which the principles of the disclosure may be utilized, and the accompanying drawings of which:

FIG. 1 shows growth cones expand on inhibition of HDAC6.

FIG. 2 shows inhibition of HDAC6 alters axonal mitochondrial transport both in vitro and in vivo.

FIG. 6 shows Miro1 K105Q is an axonal substrate for HDAC6 after exposure to CNS growth inhibitors.

Figures 3A, 3B:
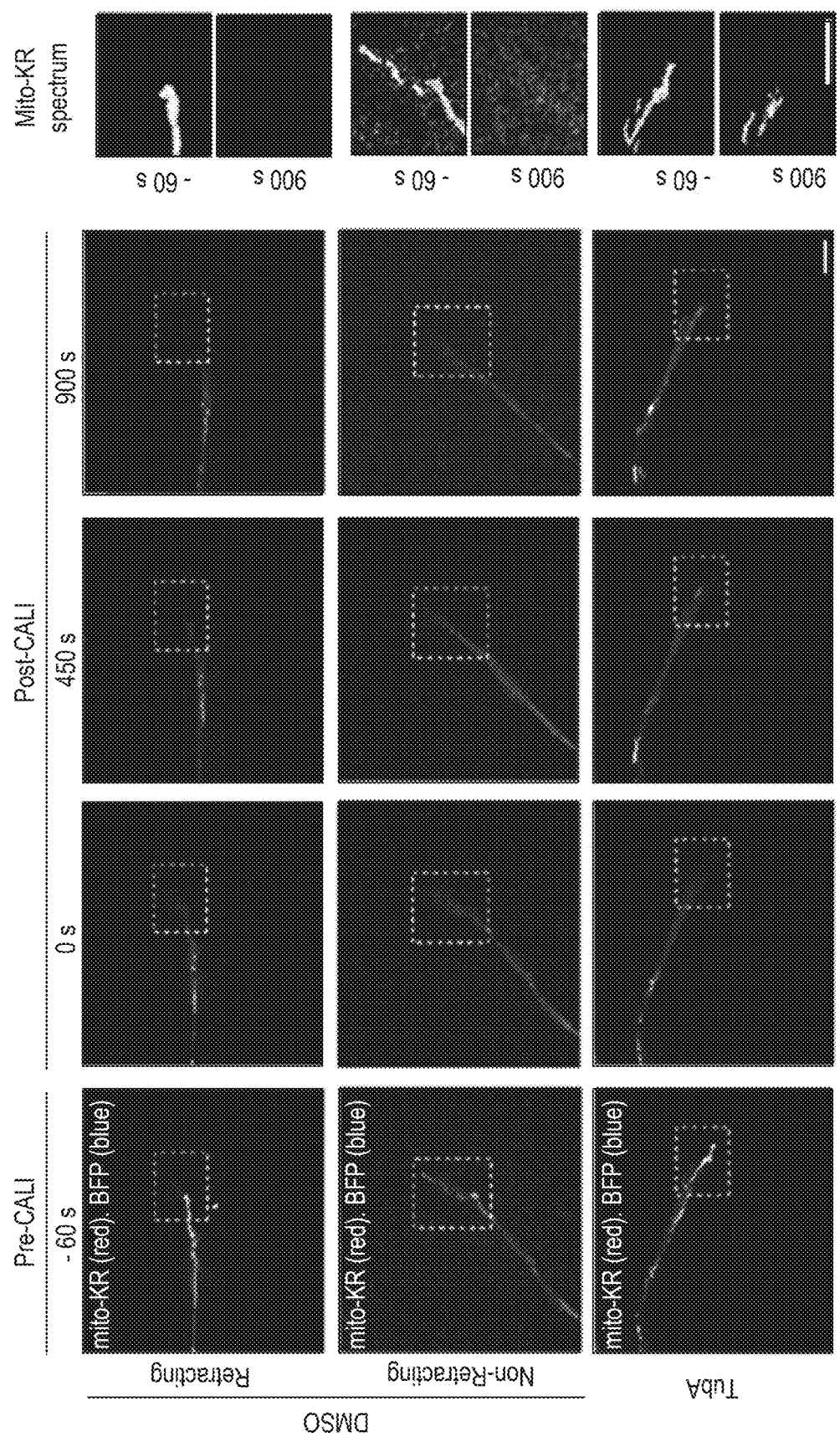
FIG. 3 shows HDAC6-inhibited growth cones are protected from collapse after mitochondrial ablation.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

The figures herein are for illustrative purposes only and are not necessarily drawn to scale.

DETAILED DESCRIPTION OF A PREFERRED EMBODIMENT

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant application should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Where a range is expressed, a further embodiment includes from the one particular value and/or to the other particular value. The recitation of numerical ranges by endpoints includes all numbers and fractions subsumed within the respective ranges, as well as the recited endpoints. Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'Y'".

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the singular forms "a", "an", and "the" include both singular and plural referents unless the context clearly dictates otherwise.

As used herein, "about," "approximately," "substantially," and the like, when used in connection with a measurable variable such as a parameter, an amount, a temporal duration, and the like, are meant to encompass variations of and from the specified value including those within experimental error (which can be determined by e.g. given data set, art accepted standard, and/or with e.g. a given confidence interval (e.g. 90%, 95%, or more confidence interval from the mean), such as variations of +/−10% or less, +/−5% or less, +/−1% or less, and +/−0.1% or less of and from the specified value, insofar such variations are appropriate to perform in the disclosure. As used herein, the terms "about," "approximate," "at or about," and "substantially" can mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

As used herein, "control" can refer to an alternative subject or sample used in an experiment for comparison purpose and included to minimize or distinguish the effect of variables other than an independent variable.

The term "optional" or "optionally" means that the subsequent described event, circumstance or substituent may or may not occur, and that the description includes instances where the event or circumstance occurs and instances where it does not.

As used interchangeably herein, the terms "sufficient" and "effective," can refer to an amount (e.g. mass, volume, dosage, concentration, and/or time period) needed to achieve one or more desired and/or stated result(s). For example, a therapeutically effective amount refers to an amount needed to achieve one or more therapeutic effects.

As used herein, the terms "weight percent," "wt %," and "wt. %," which can be used interchangeably, indicate the percent by weight of a given component based on the total weight of a composition of which it is a component, unless otherwise specified. That is, unless otherwise specified, all wt % values are based on the total weight of the composition. It should be understood that the sum of wt % values for all components in a disclosed composition or formulation are equal to 100. Alternatively, if the wt % value is based on the total weight of a subset of components in a composition, it should be understood that the sum of wt % values the specified components in the disclosed composition or formulation are equal to 100.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s). Reference throughout this specification to "one embodiment", "an embodiment," "an example embodiment," means that a particular feature, structure or characteristic described in connection with the embodiment is included in at least one embodiment of the present disclosure. Thus, appearances of the phrases "in one embodiment," "in an embodiment," or "an example embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the disclosure. For example, in the appended claims, any of the claimed embodiments can be used in any combination.

All patents, patent applications, published applications, and publications, databases, websites and other published materials cited herein are hereby incorporated by reference to the same extent as though each individual publication, published patent document, or patent application was specifically and individually indicated as being incorporated by reference.

Inhibition of histone deacetylase 6 (HDAC6) was shown to support axon growth on the nonpermissive substrates myelinassociated glycoprotein (MAG) and chondroitin sulfate proteoglycans (CSPGs). Though HDAC6 deacetylates α-tubulin, the current disclosure finds that another HDAC6 substrate contributes to this axon growth failure. HDAC6 is known to impact transport of mitochondria, and the current disclosure shows that mitochondria accumulate in distal axons after HDAC6 inhibition. Miro and Milton proteins link mitochondria to motor proteins for axon transport. Exposing neurons to MAG and CSPGs decreases acetylation of Miro1 on Lysine 105 (K105) and decreases axonal mitochondrial transport. HDAC6 inhibition increases acetylated Miro1 in axons, and acetyl-mimetic Miro1 K105Q prevents CSPG-dependent decreases in mitochondrial transport and axon growth. MAG- and CSPG-dependent deacetylation of Miro1 requires RhoA/ROCK activation and downstream intracellular $Ca^{2+}$ increase, and Miro1 K105Q prevents the decrease in axonal mitochondria seen with activated RhoA and elevated $Ca^{2+}$. These data point to HDAC6-dependent deacetylation of Miro1 as a mediator of axon growth inhibition through decreased mitochondrial transport.

Here, we show that both CSPGs and MAG attenuate axonal transport of mitochondria and decrease mitochondrial membrane potential, and these effects are prevented by inhibition of HDAC6. By use of pharmacological inhibitors, activators, and cytoplasmic $Ca^{2+}$ level modulators, our data indicate that MAG and CSPG-dependent activation of RhoA with subsequent increase in cytoplasmic $Ca^{2+}$, converge on HDAC6 to cause deacetylation of Miro1 on lysine 105 (K105), thereby blocking microtubule-dependent transport of axonal mitochondria.

These data show that signaling mechanisms downstream of MAG and CSPGs attenuate mitochondrial transport and axon growth through a pathway that converges on HDAC6 for deacetylation of Miro1. Increasing acetyl-Miro1 levels supports axon growth by sustaining mitochondrial transport and mitochondrial membrane potential in the face of CNS axon growth inhibitors.

Results

HDAC6 inhibition increases growth cone size of sensory axons. Given our previous work showing that HDAC6 inhibition allows axons to grow on MAG and CSPG substrates (Rivieccio et al., 2009; Butler et al., 2010), we asked how inhibition of HDAC6 alters axon growth in cultures of adult dorsal root ganglion (DRG) neurons. After overnight culture on laminin, dissociated adult DRGs were treated for 1 h with 10 μM tubastatin (TubA), a concentration that was previously reported to selectively inhibit HDAC6 (Rivieccio et al., 2009; Butler et al., 2010). TubA treatment did not significantly affect neurite length compared with vehicle-treated DRG neurons (FIG. 1 at A). FIG. 1 shows Growth cones expand on inhibition of HDAC6. (A) Quantification of neurite length for dissociated DRGs cultured on laminin with addition of HDAC6 inhibitor TubA (10 μm) versus vehicle control (DMSO) over 1 h is shown as average fold-change relative to vehicle±SEM (n≥95 neurons across three independent experiments; NS by one-way ANOVA with Bonferroni post hoc). (B and C) show representative DIC images of distal axons from DRG neurons cultured as in A are shown (B). 1-h TubA treatment appears to increase growth cone size. Analyses of growth cone area across multiple experiments show a significant increase in area after TubA treatment (C). Values are average fold-change±SEM (n≥26 neurons over at least three culture preparations; ***, P≤0.005 by one-way ANOVA with Bonferroni post hoc; scale bar=5 μm; 40×/1.3 NA objective used). D shows representative time-lapse image sequence in DIC for a single axon from larger tiled images after addition of TubA as in A. Arrows indicate growth cone position (scale bar=10 μm). E shows representative epifluorescent images for HDAC6 (red, Cy5) and NF (green, Cy3) immunoreactivity. Prominent HDAC6 signals are seen in distal axons and growth cones (arrows) regardless of TubA exposure. Axonal localization of transfected HDAC6 protein is shown in FIG. 1 at A (scale bar=10 μm; 40×/1.3 NA objective used). However, the TubA exposed DRG neurons showed significantly larger growth cones than the vehicle controls (FIG. 1 at B and C), and this growth cone enlargement was apparent within 10 min of TubA exposure (FIG. 1 at D). Both endogenous and transfected HDAC6 consistently concentrate in distal axons, including beyond the neurofilament (NF) signals into the growth cones of cultured DRG neurons (FIG. 1 at E and A).

Our previous work in rat embryonic cortical neurons had shown that 10 μM TubA increases levels of acetyl (Ac) α-tubulin but has no effect on histone acetylation, suggesting it is selective for HDAC6 over other HDACs (Rivieccio et al., 2009). We tested for this specificity in the adult DRG neurons from above by immunoblotting. Scriptaid, a pan-HDAC inhibitor, caused a clear increase in Ac-histone H4 levels, but 100 μM TubA caused only modest increase in Ac-histone H4, and no change in Ac-histone H4 levels were seen with 1 and 10 μM TubA or 6.3 μM Nullscript, a nonfunctional analogue of Scriptaid (FIG. 1 at B and C). However, 1, 10, and 100 μM TubA caused a clear increase in Ac-α-tubulin levels (FIG. 1 at B and C). By immunolabeling, a significant increase in anti-Ac-α-tubulin immunoreactivity in growth cones was seen with 10 μM TubA compared with control cultures, with no change in tyrosinated α-tubulin (FIG. 2, A-C). FIG. 2 shows inhibition of HDAC6 alters axonal mitochondrial transport both in vitro and in vivo. (A) Number of mitochondria in growth cones after exposing DRG cultures to 10 μM TubA versus vehicle (control) for 1 h is shown as average fold-change in number of mitochondria per growth cone±SEM (n=13 axons across three culture preparations; *, P≤0.05 by one-way ANOVA with Bonferroni post hoc analysis). (B) Representative EMs of Remak bundles (arrowheads) in naive Sciatic nerve and nerves after 2 h vehicle (DMSO) or TubA injection are shown. Arrows indicate mitochondria in the unmyelinated axons. Note that a Schwann cell nucleus (asterisk) is seen in the Remak bundle for DMSO image but not the other two micrographs (scale bar=3 μm). (C) Quantification of number of mitochondria per unmyelinated axon from EM images as in B is shown as average±SEM (n≥5; *****, P≤0.0001 by one-way ANOVA with Bonferroni post hoc analysis). (D-F) Quantification for indicated parameters for mitochondrial transport in sciatic nerve in vivo using tetramethylrhodamine, ethyl ester, perchlorate to visualize mitochondria is shown. The percentage pausing mitochondria is significantly different for retrogradely tracked mitochondria in DMSO versus TubA injected nerves (n≥13 axons tracked over four animals; *, P≤0.05 and as indicated by ANOVA with Holm-Sidak's multiple comparisons test). Along with the increased Ac-α-tubulin, growth cone signals for F-actin were consistently decreased in the TubA-treated cultures (FIG. 2 at A and D). These data indicate rapid changes in cytoskeletal dynamics of the distal axons upon HDAC6 inhibition.

Mitochondria Accumulate in Growth Cones After HDAC6 Inhibition

Figures 3C, 3D, 3E:
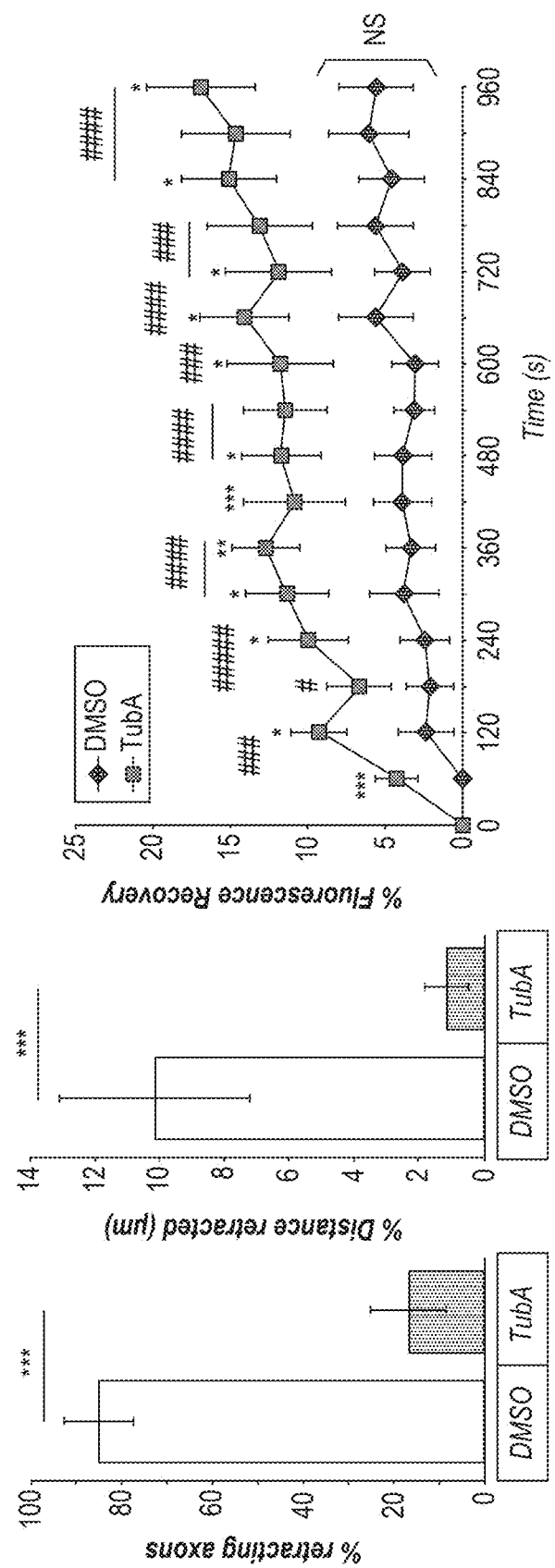

HDAC6 inhibition was previously shown to increase transport of mitochondria in axons of embryonic rodent hippocampal and chick sensory neurons (Chen et al., 2010; Kim et al., 2012; Rui and Zheng, 2016; Sainath et al., 2017), and axonal mitochondrial transport has been linked to axon growth (Steketee et al., 2012; Cartoni et al., 2016; Lewis et al., 2016; Zhou et al., 2016). By live cell imaging with MitoTracker to visualize mitochondria, DRG neurons appeared to show increased anterograde versus retrograde mitochondrial movement along axons (FIG. 3 at A and B). FIG. 3 shows HDAC6-inhibited growth cones are protected from collapse after mitochondrial ablation. (A and B) Representative images from CALI time lapse sequence are shown for DRGs cultured on laminin and treated with vehicle control (DMSO) versus 10 μM TubA for 1 h (A). BFP is shown in blue as an axonal marker and Mito-KR signal is shown in red. Boxed regions represent ROI for distal axon and growth cone that was subjected to photoactivation of Mito-KR to ablate mitochondria. (B) Magnified view of ROI with Mito-KR signal as indicated spectral intensity for −60-s and +900-s panels from time lapse. A and B shows that axons analyzed across the DMSO- and TubA-treated cultures had no significant differences in growth cone area or Mito-KR signal intensity before CALI sequence. Images were equivalently adjusted for brightness and contrast before cropping using ImageJ (scale bars=10 µm for main panels, 2 µm for insets; 63×/1.4 NA objective used). (C and D) Quantifications of percentage of axons retracting (C) and retraction distance (D) from image sequences as in A are shown as average±SEM (n≥13 across three culture preparations; ***, P≤0.005 by one-way ANOVA with Bonferroni post hoc analysis). (E) Recovery of Mito-KR red fluorescence in photoactivated ROI from image sequences as in A is shown as average of normalized percentage recovery±SEM (n≥13 axons from three independent experiments; *, P≤0.05; , P≤0.01; *, P≤0.005 vs. t=0; ###, P≤0.005; ####, P≤0.001, #####, P≤0.0005 for TubA vs. control; and NS vs. t=0 s by one-way ANOVA with Bonferroni post hoc analysis).

There were no significant differences in the speed, track durations, or directionality for axonal mitochondrial movements (FIG. 3 at C-E), but there was a significant increase in mitochondrial profiles in the growth cones of the HDAC6-inhibited cultures (FIG. 2 at A), and the HDAC6-inhibited cultures consistently showed more anterogradely than retrogradely moving mitochondria in axons (FIG. 3 at E). To determine if TubA might also affect axonal mitochondria in vivo, we directly injected TubA into the sciatic nerve of adult rats at mid-thigh. Analysis of nerves immediately adjacent to the injection sites by EM 2 h after injection showed that mitochondrial numbers in the vehicle-treated nerves were not significantly different than nerves that were not manipulated, indicating that the trauma from injection did not affect number of mitochondria in unmyelinated axons (i.e., naive nerves; FIG. 2 at B and C). However, the nerve exposed to TubA showed significantly increased mitochondrial numbers in the unmyelinated axons, where we surmise the TubA and DMSO vehicle would have greatest penetration in these intact adult nerves (FIG. 2, B and C). As this could reflect stalling of mitochondria or increased numbers of anterogradely and/or retrogradely moving mitochondria, we performed in vivo imaging to visualize mitochondrial dynamics.

Similar to the kinetic analyses in cultured primary neurons, the ratio of anterogradely to retrogradely moving axonal mitochondria increased with TubA (FIG. 2 at D and E), but neither this nor the speed of movement showed significant differences compared with vehicle control. However, there was significantly increased pausing for retrogradely versus anterogradely moving mitochondria after exposure to TubA (FIG. 2 at F). Together, these experiments indicate that HDAC6 activity impacts axonal mitochondrial transport in vitro and in vivo.

HDAC6 Inhibition or Depletion Protects Axons from Mitochondrial Damage

Studies in several neuronal systems have shown the importance of mitochondrial respiration and transport in axon growth (Steketee et al., 2012; Cartoni et al., 2016; Lewis et al., 2016; Zhou et al., 2016). The mitochondrial transport dynamics above showed a relative increase in anterograde versus retrograde movement, but this was overall modest. Nonetheless, the accumulation of mitochondria in growth cones could be reflective of this shift, so we asked if the growth cone accumulation of mitochondria seen after HDAC6 inhibition has any biological significance.

For this, we turned to chromophore-assisted light inactivation (CALI) to ablate mitochondria from distal axons of DRG cultures expressing mitochondrial-targeted Killer Red (Mito-KR) protein. CALI of KR protein generates reactive oxygen species (ROS) to ~1,000-fold higher than the fluorescent emission eGFP generates (Sano et al., 2014). Increased ROS production upon CALI of Mito-KR protein leads to mitochondrial damage and ablation of mitochondrial function, including the axonal mitochondria targeted in our experiments (Shibuya and Tsujimoto, 2012; Spillane et al., 2013). Since TubA treatment expanded growth size and altered mitochondrial transport, we attempted to choose axons for these CALI experiments that were matched for growth cone size and mito-KR signal intensity; analyses of average growth cone areas and Mito-KR fluorescent intensities showed no significant differences between control and TubA-treated axons tested in the pre-CALI time points. Approximately 85% of axons subjected to CALI in the vehicle-treated cultures showed rapid growth cone retraction (FIG. 3 at A-D). In contrast, the majority of the TubA-treated cultures showed no growth cone retraction after CALI (FIG. 3 at A-D), and the distal axons showed significant recovery of mitochondrial fluorescence in the bleached region of interest (ROI) after CALI compared with vehicle-treated cultures (FIG. 3 at E).

Although the 10-µM TubA dose clearly increases levels of Aca-tubulin by immunoblotting and immunofluorescence, we sought to exclude the possibility that off-target effects of TubA might cause these effects on mitochondria. Thus, we applied this CALI approach to DRGs that were also cotransfected with HDAC6 or control siRNAs (siHDAC6 and siControl, respectively). siHDAC6 significantly depleted HDAC6 from the DRG neurons compared with the siControl. siHDAC6-transfected cultures showed significantly less growth cone retraction after mitochondrial ablation with CALI, similar to the TubA-treated cultures. The siHDAC6-transfected cultures also showed significantly greater Mito-KR fluorescent recovery in CALI ROI during the post-CALI period compared with the siControl-transfected cultures. Since activation of the Mito-KR with CALI permanently ablates mitochondria, the fluorescent recovery of Mito-KR in the ROI likely represents transport of mitochondria from more proximal segments of the axon in the HDAC6-inhibited and HDAC6-depleted neurons. Although we cannot completely exclude increased uptake of Mito-KR in these neurons, data below using different mitochondria labeling methods are consistent with a net shift to increased anterograde movement of axonal mitochondrial when HDAC6 is inhibited.

MAG and CSPGs Attenuate Mitochondrial Transport in Axons Through Activation of RhoA.

Inhibition of HDAC6 was shown to prevent axon retraction seen with exposure to MAG and CSPGs (Rivieccio et al., 2009), so we next asked if the recovery of mitochondria after CALI might be affected by recombinant human MAG as an Fc fusion or Fc control proteins (MAG-Fc and Fc, respectively). After 4-h exposure to MAG-Fc by bath application, DRG cultures showed significantly decreased recovery of Mito-KR fluorescence in the CALI ROI compared with Fc-exposed cultures, and this was reversed by treatment with TubA (FIG. 4 at A).

Figure 4G:
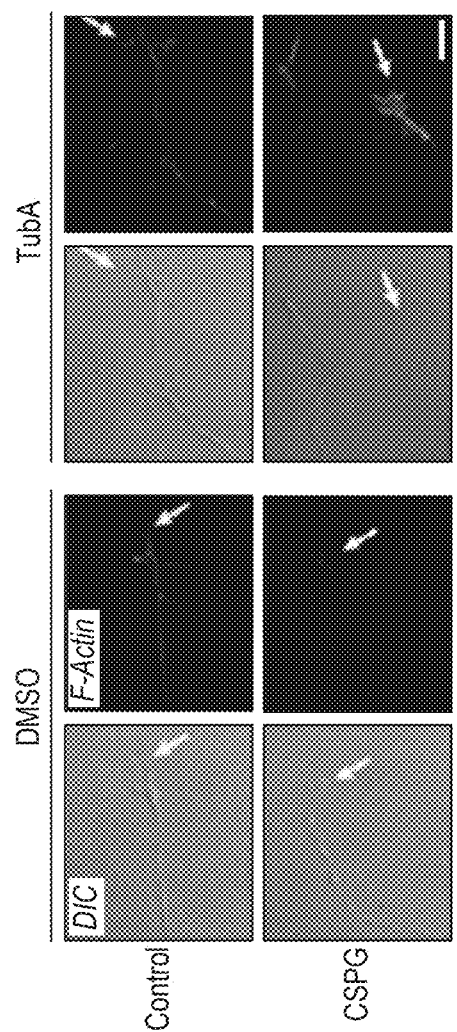
FIG. 4 shows MAG and CSPGs decrease mitochondrial transport through an HDAC6-dependent pathway.
Figure 4H:
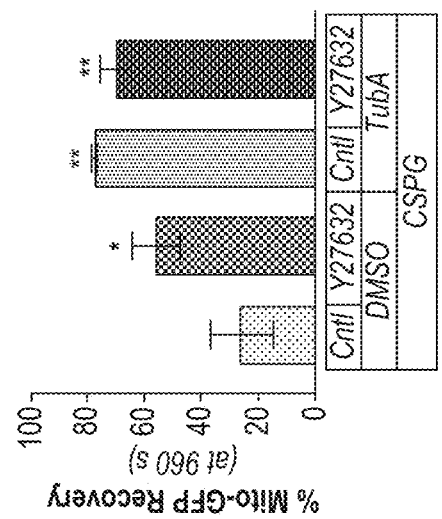
Figure 5A:
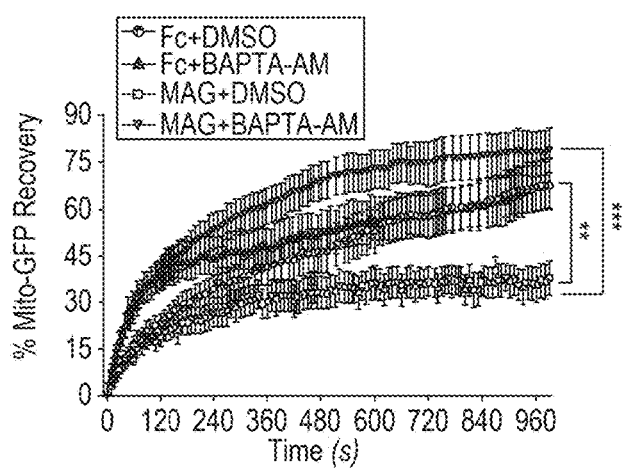
FIG. 5 shows RhoA/ROCK pathway activates HDAC6 through a Ca2+-dependent mechanism.
Figure 5B:
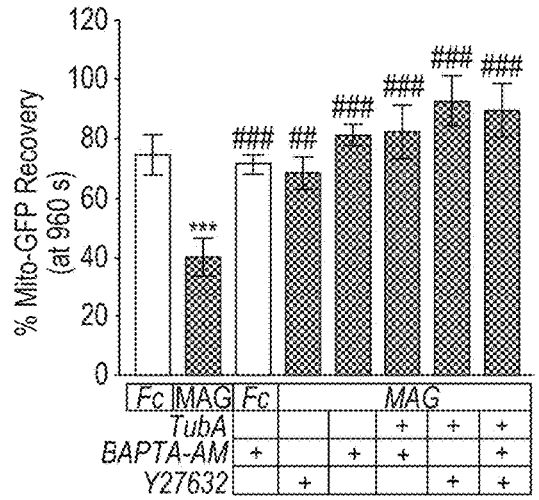
Figure 5C:
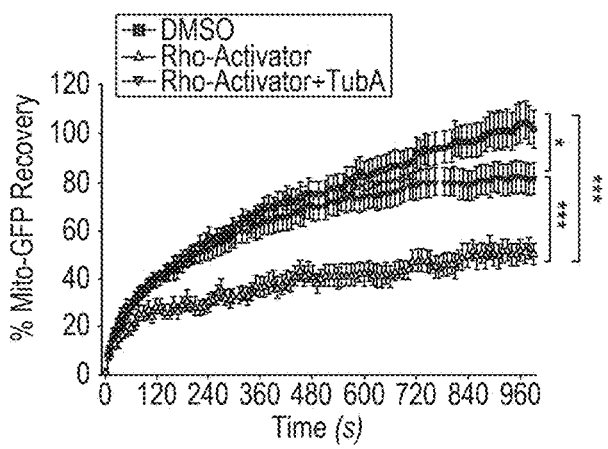
Figure 5D:
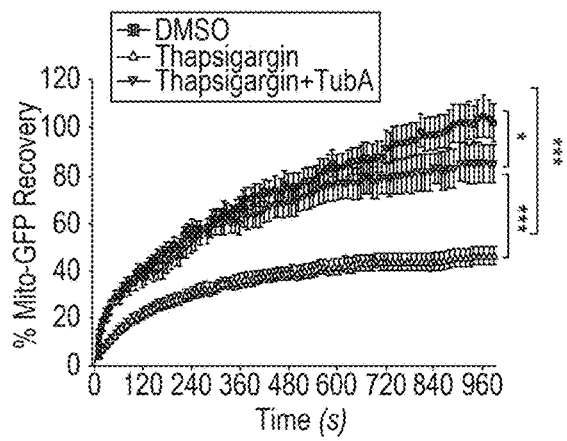
Figure 5E:
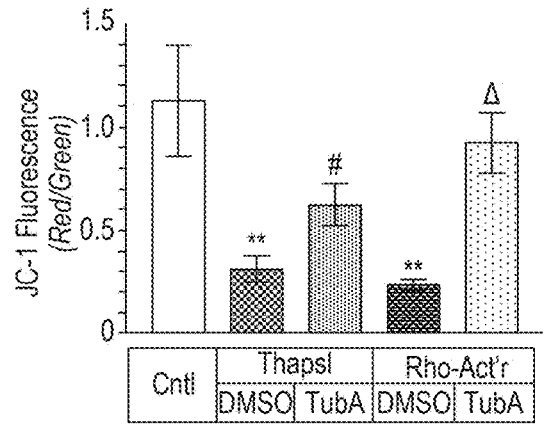
Figure 5F:
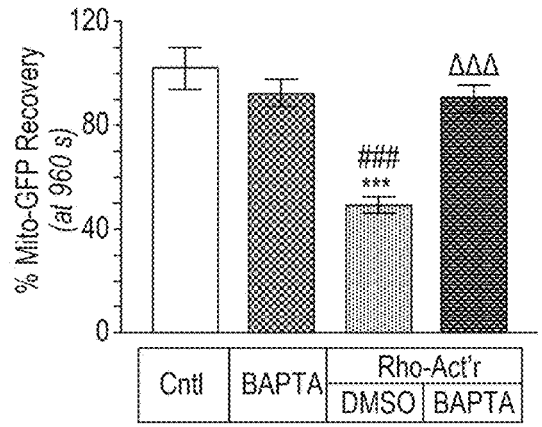
Figure 7E:
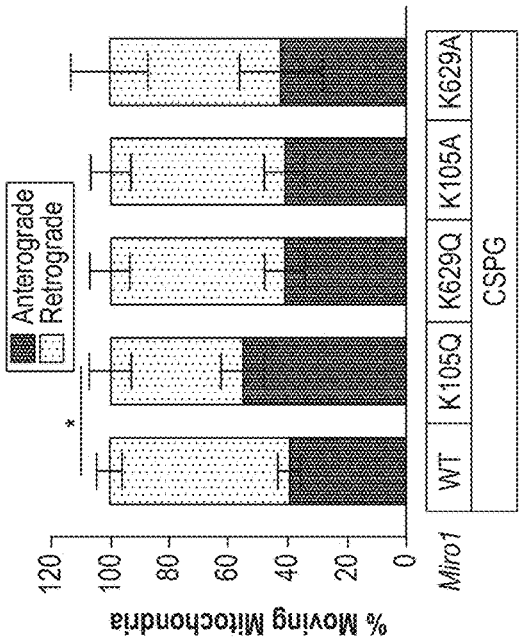
FIG. 7 shows acetylation of Miro1 on K105 increases mitochondrial transport and supports axon growth on CNS growth inhibitory substrates.
Figure 7F:
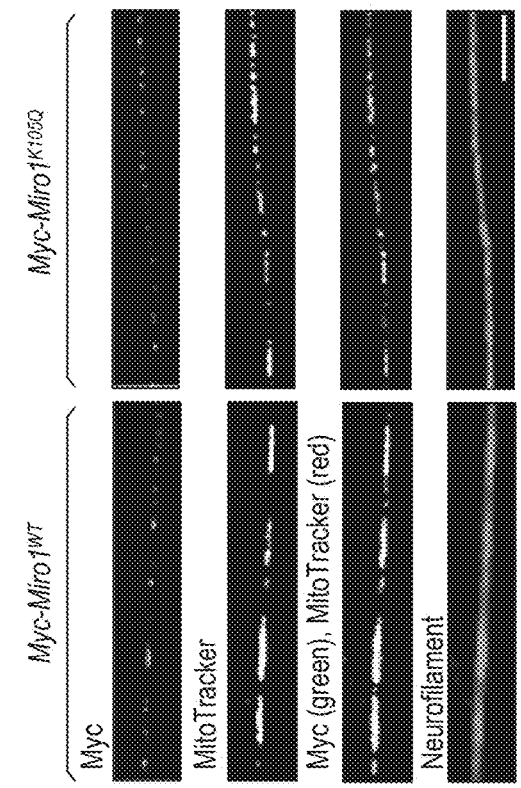
Figure 7G:
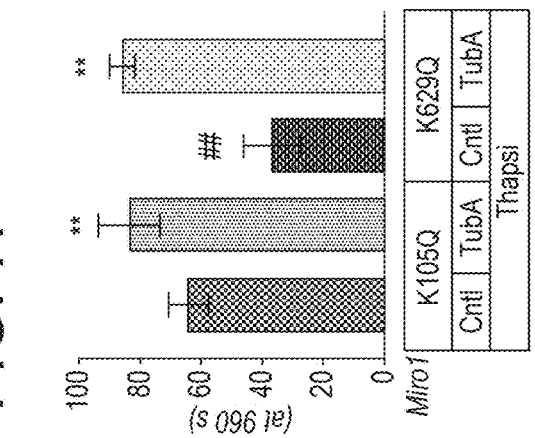
Figure 7H:
Figure 7I:
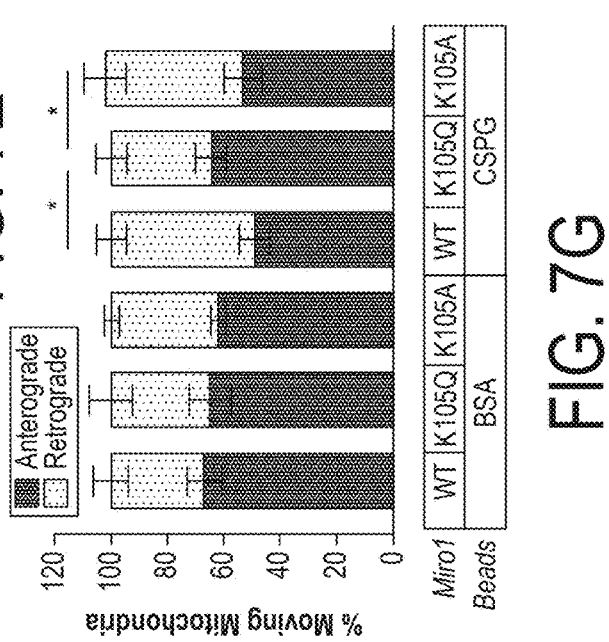

FIG. 4 shows MAG and CSPGs decrease mitochondrial transport through an HDAC6-dependent pathway. (A) Recovery of Mito-KR signals after CALI to ablate mitochondria in distal axons of DRGs cultured on laminin and exposed to vehicle control (DMSO) or to bath-applied Fc+DMSO, MAG-Fc+DMSO or MAG-Fc+10 μm TubA. Values represent average of normalized percentage recovery±SEM (n≥16 axons over five culture preparations; *, P≤0.05; *, P≤0.005 for indicated treatments by two-way ANOVA with Tukey post hoc). Fc+DMSO was not significantly different than vehicle control (not depicted). (B) End-point FRAP analysis for Mito-GFP in distal axons of DRGs cultured on laminin and treated bath-applied Fc vs. MAG-Fc as in A is shown as average of normalized percentage recovery ±SEM at 960 s after bleach (n≥12 axons over four culture preparations; , P≤0.05 vs. Fc-control; ##, P≤0.01 vs. MAG+vehicle by two-way ANOVA with Tukey post hoc). (C) FRAP analysis for Mito-GFP recovery in distal axons of DRGs cultured on laminin and treated with ±10 μg/ml bath-applied aggrecan (Cntl or CSPG) and 10 μM TubA or vehicle control (DMSO) is shown as average of normalized percentage recovery±SEM at 960 s after bleach (n≥16 axons over four culture preparations; *, P≤0.05 for control+DMSO vs. control+TubA and control+DMSO vs. CSPG+DMSO; ***, P≤0.005 for CSPG+DMSO vs. CSPG+TubA and CSPG+DMSO vs. control+TubA by two-way ANOVA with Tukey post hoc). (D and E) Mitochondrial membrane potential was assessed in axon shafts of DRGs cultured on laminin and then treated with bath-applied MAG-Fc (D) or aggrecan (CSPG; E) as in A and C. Values indicate average ratio of normalized red/green fluorescence signals±SEM within the ROIs after indicated treatments (n≥25 axons over four culture preparations; *, P≤0.05; , P≤0.01 vs. DMSO; #, P≤0.05; ##, P≤0.01 vs. MAG+DMSO or CSPG+DMSO by two-way ANOVA with Tukey post hoc). (F) Quantitation of axon growth for DRGs cultured on laminin (Cntl) or substrate-bound aggrecan (CSPG) and treated with DMSO or 10 μM TubA. Axon growth was assessed at 24 h and is shown as average total length/neuron±SEM (n≥95 each over three DRG cultures; *, P≤0.005 vs. control; **, P≤0.005 vs. CSPG+vehicle by two-way ANOVA with Tukey post hoc). (G) Representative DIC and F-actin (green, Alexa Fluor 555) images of distal axons from DRGs cultured on laminin and treated with 10 μM TubA or vehicle control (DMSO) are shown before and after bath-applied 10 μg/ml aggrecan (CSPG). Arrows mark axon termini. Images were cropped from larger panels to highlight growth cones using ImageJ (scale bar=10 μm; 63×/1.4 NA objective used). (H) End-point FRAP analyses for Mito-GFP in distal axons of DRGs cultured on laminin and treated with bath-applied 10 μg/ml aggrecan are shown as average of normalized percentage recovery±SEM at 960 s after bleach. To test for effects of ROCK inhibition, neurons were pretreated with vehicle (Cntl) or 10 μM Y27632. To test for potential synergism with HDAC6 inhibition, control and Y27632-treated cultures were exposed to DMSO or 10 μM TubA (n≥16 axons over four culture preparations; *, P≤0.05; ##, P≤0.005 for indicated treatments by two-way ANOVA with Tukey post hoc).

Since a difference in mitochondrial ROS release upon Mito-KR activation could impact transport of mitochondria and hence CALI recovery in the HDAC6-inhibited neurons, we expressed Mito-GFP and used traditional FRAP assays to compare recovery in MAG-Fc-treated versus Fc-treated cultures. Recovery of Mito-GFP fluorescent signals in the FRAP ROI was also significantly decreased in the distal axons of cultures treated with MAG-Fc compared with the control Fc, and this was prevented by TubA pretreatment (FIG. 4 at B). Bath application of the CSPG aggrecan similarly attenuated recovery of Mito-GFP fluorescence from FRAP of distal axons, and this was prevented by treatment with TubA (FIG. 4 at C).

To determine if the effect of growth inhibitors on mitochondrial recovery was limited to distal axons, we performed FRAP on more proximal segments of the axon shaft in DRG neurons expressing Mito-GFP. For analyses of recovery, the bleached ROIs were divided into four subregions along the axon length so that we could distinguish anterograde from retrograde transport-driven Mito-GFP recovery. Control cultures showed more rapid recovery in the distal bleached axon segment, and this was appreciably decreased by bath application of MAG-Fc. In contrast, the TubA-treated cultures showed more rapid recovery in proximal segments, and MAG-Fc's attenuation of axonal Mito-GFP recovery was prevented by HDAC6 inhibition. Since this effect of MAG-Fc on recovery could derive from either axons or cell body, we cultured dissociated DRGs in microfluidic devices where we could limit exposure to MAG-Fc and TubA to the axons. Consistent with MAG-Fc decreasing Mito-GFP fluorescent recovery in the proximally oriented axonal ROIs in the above experiment, application of MAG-Fc to the axonal compartment decreased numbers of mitochondria in the distal axons, and this was prevented by TubA treatment. TubA treatment also prevented the axon retraction and end bulb formation in distal axons that was seen after MAG-Fc exposure. Localized exposure of axons to CSPG similarly decreased mitochondrial transport in axons. Taken together, these data suggest that the MAG- and CSPG-dependent effects on mitochondrial transport initiate from HDAC6 activity within the axon, as we previously showed for HDAC6's role in MAG- and CSPG-dependent axon growth inhibition (Rivieccio et al., 2009).

Considering the above changes in mitochondrial transport, we asked if MAG and CSPG might affect mitochondrial function in axons. Functional mitochondria are needed to generate ATP, and the mitochondrion's membrane potential ($\Psi_M$) is thought to reflect its capacity for generating ATP. Increased anterograde transport of mitochondria in axons correlated with higher $\Psi_M$, as measured by the ratiometric 5,5',6,6'-tetrachloro-1,1',3,3'-tetraethylbenzimidazolcarbocyanine iodide (JC-1) dye (Miller and Sheetz, 2004), and reduced axonal $\Psi_M$ in Drosophila melanogaster larvae was recently correlated with overall decrease in mitochondrial transport (Liao et al., 2017). Interestingly, there was a significant decrease in $\Psi_M$ in DRG cultures after bath application of MAG-Fc or CSPG (FIG. 4 at D and E). These declines in $\Psi_M$ were prevented by inhibition of HDAC6 with TubA. This suggests that there is an HDAC6-dependent decrease in mitochondrial respiration upon exposure to CNS growth inhibitory proteins.

MAG and CSPGs are more often tested as surface-bound substrates than with the bath applications used here. Thus, we tested whether bath application of growth inhibitors would cause growth cone retraction in a manner similar to surface-bound inhibitors. As expected, the aggrecan used here attenuated axon growth when bound to coverslips, and this was prevented by TubA exposure (FIG. 4 at F). Bath application of aggrecan at doses used in the experiments above caused rapid retraction of growth cones, and this was prevented by application of TubA (FIG. 4 at G). Similar effects were observed for bath applied MAG-Fc (not depicted). RhoA activation is a well-known downstream mediator for the growth-inhibitory effects of both MAG and CSPGs (Fujita and Yamashita, 2014), so we tested whether the RhoA/ROCK pathway contributes to the impact of aggregan on mitochondria distribution in growth cones. Pharmacological inhibition of ROCK with Y27632 prevented the aggrecan dependent decrease in Mito-GFP recovery in distal axons after photobleaching (FIG. 4 at H), indicating that the RhoA/ROCK pathway is involved in reducing mitochondrial transport into axons in response to aggregan. Interestingly, no significant additive effects were seen when the ROCK inhibitor was combined with 10 µM TubA (FIG. 4 at H). ROCK inhibition similarly blocked the decline in mitochondrial transport in response to MAG-Fc, and there was no additive or synergistic effect when combined with TubA treatment (see FIG. 5 at B). Taken together, these data raise the possibility that decreases in mitochondrial transport and $\Psi_M$ contribute to HDAC6-dependent attenuation of axon growth after exposure to CNS growth inhibitors through a RhoA/ROCK signaling pathway.

FIG. 5 shows RhoA/ROCK pathway activates HDAC6 through a Ca2+-dependent mechanism. (A) FRAP analyses for Mito-GFP in distal axons of DRGs cultured on laminin and treated with bath-applied Fc+DMSO, Fc+3 µM BAPTA-AM, MAG-Fc+DMSO, or MAG-Fc+3 µM BAPTA-AM are shown as average normalized percentage recovery±SEM ($n \geq 9$ axons over three culture preparations; , $P \leq 0.01$; *, $P \leq 0.005$ for indicated treatments by two-way ANOVA with Tukey post hoc). BAPTA-AM is not statistically different from over 300 to 960 s. (B) End-point FRAP for Mito-GFP in distal axons of DRGs treated with bath-applied Fc vs. MAG-Fc±3 µM BAPTA-AM, 10 µM Y27632, 10 µM TubA, or indicated combinations of these inhibitors is shown as average of normalized percentage recovery±SEM at 960 s after bleach ($n \geq 9$ axons over three culture preparations; ***, $P \leq 0.005$ vs. Fc; ##, $P \leq 0.01$; ###, $P \leq 0.005$ vs. Mag-treated by two-way ANOVA with Tukey post hoc). BAPTA-AM is not statistically different from vehicle. (C and D) FRAP for Mito-GFP in distal axons of DRGs treated with RhoA Activator (C) or Thapsigargin (D) is shown as average normalized percentage recovery±SEM. Data for vehicle control (DMSO), 1 µg/ml of Rho-Activator (+DMSO), Rho-Activator+10 µM TubA, 1 µM Thapsigargin (+DMSO), and Thapsigargin+10 µM TubA are shown ($n \geq 9$ axons over three culture preparations; *, $P \leq 0.05$; *, $P \leq 0.005$ for indicated treatments by two-way ANOVA with Tukey post hoc). (E) Quantification of mitochondrial membrane potential based on red/green fluorescence of JC-1 in axon shafts of DRGs cultured on laminin (Cntl) or aggrecan (CSPG) substrates is shown after treatment with 1 µM Thapsigargin (Thapsi), Thapsi+10 µM TubA, 1 µg/ml Rho-Activator (Rho-Act'r), or Rho-Act'r+TubA. Values represent average ratio of normalized red/green fluorescent JC-1 signals±SEM ($n \geq 20$ axons over three culture preparations; , $P \leq 0.01$ vs. control; #, $P \leq 0.05$ vs. Thapsi+DMSO; $\Delta$, $P \leq 0.01$ vs. Rho-Act'r+DMSO by two-way ANOVA with Tukey post hoc). (F) End-point FRAP for Mito-GFP in distal axons of DRGs cultured on laminin and treated ±3 µM BAPTA-AM, 1 µg/ml Rho-Act'r, Rho-Act'r+BAPTA-AM is shown as average of normalized percentage recovery±SEM at 960 s after bleach ($n \geq 9$ axons over three culture preparations; ***, $P \leq 0.005$ vs. control; ###, $P \leq 0.005$ vs. BAPTA-AM; $\Delta\Delta\Delta$, $P \leq 0.005$ vs. Rho-Act'r+DMSO by two-way ANOVA with Tukey post hoc). BAPTA-AM is not statistically different from control.

$Ca^{2+}$ is Downstream of RhoA for HDAC6-Dependent Attenuation of Mitochondrial Transport By CNS Growth Inhibitors Both MAG and CSPGs are known to increase axoplasmic $[Ca^{2+}]$ (Snow et al., 1994; Henley et al., 2004), and increased cytoplasmic $Ca^{2+}$ has been shown to decrease microtubule-based transport of mitochondria (Lin and Sheng, 2015). To test the potential contribution of $Ca^{2+}$ in attenuating axonal mitochondrial transport after exposure to CNS growth inhibitors, we used BAPTA-AM to chelate intracellular $Ca^{2+}$. We initially titrated successively lower BAPTA-AM concentrations to reach a concentration with minimal effects on basal mitochondrial transport. At 3 µM BAPTA-AM, mitochondria showed increased recovery in the distal axons over the first 5 min after bleach, but FRAP recovery was no different than recovery in untreated cultures thereafter (FIG. 5 at A). 3 µM BAPTA-AM prevented the MAG-Fc attenuation of axonal mitochondrial transport, comparing recoveries as end-point values (i.e., at 960 s after bleach; FIG. 5 at A and B). No significant additive effects were seen when combining 3 µM BAPTA-AM with 10 µM TubA (FIG. 5 at B). ROCK inhibition similarly prevented the MAG-dependent decrease in mitochondrial transport, and there was no additive or synergistic effect when ROCK inhibition was combined with 3 µM BAPTA-AM (FIG. 5 at B). Finally, combined treatment with 10 µM TubA, 3 µM BAPTA-AM, and ROCK inhibitor did not increase mitochondrial transport above the results seen with HDAC6 inhibition, $Ca^{2+}$ chelation, or ROCK inhibition alone (FIG. 5 at B). These observations raise the possibility of a signaling pathway involving RhoA/Rock activation and increased cytoplasmic $[Ca^{2+}]$ for HDAC6 activation and decreased mitochondrial transport in response to these CNS growth inhibitors.

Because it was also possible that we had simply reached a maximum rate of mitochondrial transport such that no additive or synergistic effects could be seen above with our FRAP-based assay, we directly activated RhoA or increased cytoplasmic $[Ca^{2+}]$ and tested for effects on axonal Mito-GFP transport and $\Psi_M$. Application of the RhoA activator II compound (Flatau et al., 1997; Schmidt et al., 1997) decreased axonal mitochondrial transport, and this was prevented by treatment with TubA (FIG. 5 at C). Releasing ER $Ca^{2+}$ stores by treatment with thapsigargin similarly decreased mitochondrial transport in the DRG axons, and this was prevented by inhibition of HDAC6 (FIG. 5 at D). Both the Rho activator and thapsigargin decreased $\Psi M$ in the axons, which was also prevented by HDAC6 inhibition (FIG. 5 E). Finally, we directly tested whether $Ca^{2+}$ could be downstream of RhoA activation in this signaling pathway. Chelation of intracellular $Ca^{2+}$ with BAPTA-AM completely abrogated the decrease in axonal mitochondrial transport seen upon direct activation of RhoA (FIG. 5 at F). Together, these data suggest that RhoA/ROCK activation followed by increase in axoplasmic $Ca^{2+}$ decreases axonal mitochondria transport through an HDAC6-dependent pathway.

HDAC6 Deacetylates Miro1 to Modulate Mitochondrial Transport in Axons

Considering that the studies above suggest that the decrease in mitochondrial transport seen after MAG and CSPG exposure is an HDAC6-dependent process, we next investigated what might lie downstream of HDAC6. Acetylated K40 in α-tubulin is a substrate for HDAC6 (Hubbert et al., 2002; Matsuyama et at, 2002; Zhang et al., 2003). Substitution of Gln for lysine has been reported to mimic acetylated Lys, and substitution of Ala for Lys generates a nonacetylatable protein (Li et at, 2002). We transfected DRG neurons with acetyl-mimetic K40Q and nonacetylatable K40A α-tubulin cDNA expression constructs to determine if HDAC6-dependent deacetylation of α-tubulin accounts for the above changes in mitochondrial transport. Despite that the K40A and K40Q α-tubulin-mCherry mutant proteins were clearly incorporated into microtubules in the axons of cultured DRGs at levels comparable to WT α-tubulin-mCherry protein, HDAC6-dependent increases in axonal mitochondrial transport were still seen in DRGs expressing either nonacetylatable or acetyl-mimetic α-tubulin by FRAP assays (FIG. 6 at A).

FIG. 6 shows Miro1 K105Q is an axonal substrate for HDAC6 after exposure to CNS growth inhibitors. (A) Endpoint FRAP for Mito-GFP recovery in distal axons of DRGs transfected with WT, acetyl-mimetic (K40Q), or nonacetylatable (K40A) α-tubulin constructs and plated onto laminin is shown as average of normalized percentage recovery±SEM at 960 s after bleach. Exposure to 10 µM TubA significantly increases Mito-GFP recovery in all three conditions (*, P≤0.05 for TubA-treated vs. its corresponding DMSO control by two-way ANOVA with Tukey post hoc). (B) Representative immunoblot is shown for Miro1 from input and immunoprecipitations with magnetic bead-conjugated nonimmune IgGs or anti-Ac-Lys antibody cocktail from DRG neurons treated with 10 µM TubA for 4 h. 10% of the protein lysate was used as input (pull-down efficiency of 10.1±1.9% for control vs. 14.1±2.2% for TubA over n=4; P=0.012 by two-tailed Student's t test). (C) HDAC6 is detected in Miro1 immunoprecipitates, and Miro1 is detected in HDAC6 immunoprecipitates from cultured DRG neurons by immunoblotting. 10% of the protein lysate was used as input. (D) Schematic of rat Miro1 sequence with residues previously reported to be acetylated in nonneuronal cells indicated (K105, K525, and K629 plus (Ac)). The glutamate-to-lysine mutations that were previously reported to decrease Miro1 $Ca^{2+}$ sensitivity are indicated by (KK). Residues corresponding to GTPase, EF-hand, and transmembrane (TM) domains are shown. (E) Representative immunoblots are shown for anti-Myc from DRG neurons transfected with Myc-Miro1K105A, Myc-Miro1K525A, or Myc-Miro1K629A plasmids and treated with 10 µM TubA for 4 h at 36 h after transfection (40 h in vitro). Input (10%) and immunoprecipitations with nonimmune IgG and Ac-Lys antibody cocktail. (F) Representative immunoblots are shown for anti-Miro1-AcK105 for DRG lysates ±10 µM TubA. For the right-hand blot, the anti-Miro1-AcK105 antibody was preincubated with 100 µg/ml immunizing peptide (short exposure=30 s; long exposure=3 min). (G and H) Representative immunoblots are shown in G for anti-Miro1-AcK105, anti-Miro1, and anti-Erk1 (loading control) from lysates of DRG cultures treated with 10 µg/ml aggrecan (CSPG) or 1 µM thapsigargin (Thapsi) for 4 h. H shows quantification of immunoblot signals across multiple experiments as average fold-change relative to control±SEM (n=3; *, P≤0.05 by one-way ANOVA with pairwise comparison and Tukey post hoc tests). (I and J) Representative confocal projection images (XYZ) for anti-Miro1-AcK105 (Cy5), anti-NF (Cy3), and MitoTracker Green are shown as indicated in J for control, aggrecan-treated (CSPG) or thapsigargin-treated cultures. ImageJ was used for pseudocoloring and channel merging. Panel I shows quantification of the axonal anti-Miro1-AcK105 signals under these conditions as average fold-change relative to control±SEM (n=20; *, P≤0.05 by one-way ANOVA with pairwise comparison and Tukey post hoc; scale bar=20 µm; 100×/1.4 NA objective used).

This raises the possibility that HDAC6 substrates other than α-tubulin contribute to HDAC6's attenuation of mitochondrial transport. $Ca^{2+}$-dependent dissociation of the Miro/Milton protein complex, which links mitochondria to motor proteins Lee and Lu, 2014, or activation of Syntaphilin protein, which docks mitochondria in axons and dendrites (Lin and Sheng, 2015), can decrease mitochondrial transport in axons.

Protein acetylome profiles from nonneuronal cells have reported acetylation of Miro1/2 and Milton 1/2 but not of Syntaphilin (Choudhary et al., 2009; Lundby et al., 2012; Wagner et al., 2012). Of these, Miro1 showed the highest number of acetylation sites, with three separate sites reported. Consistent with this report, we see that mouse and rabbit anti-Ac-Lys antibody cocktail immunoprecipitates Miro1 from lysates of cultured DRGs, with the anti-Ac-Lys immunoprecipitated Miro1 band modestly increasing upon treatment with TubA (FIG. 6 at B). Moreover, Miro1 and HDAC6 coimmunoprecipitate (FIG. 6 at C), suggesting that these proteins do interact.

The three reported acetylation sites for Miro1 in human cell lines K92, K512, and K618 (Choudhary et al., 2009; Lundby et al., 2012) correspond to K105, K525, and K629 in rat Miro1 (FIG. 6 at D). We generated Lys-to-Ala mutants for K105, K525, and K629 to determine if these Miro1 residues are acetylated in neurons (Myc-Miro1K105A, Myc-Miro1K525A, and Myc-Miro1K629Q; FIG. 6 at D). Immunoprecipitation with anti-Ac-Lys antibodies showed that acetylation of myc-tagged Miro1 was completely lost only for the K105A mutant (FIG. 6 at E). To more definitively assess acetylation of K105, we used acetylated Miro1 peptides to generate an anti-Miro1-AcK105 antibody. Anti-Miro1-AcK105 showed a single band on immunoblots of lysates from DRG neurons, with a clear increase in signal when the cells were exposed to TubA (FIG. 6 at F). The anti-Miro1-AcK105 signals were completely lost when the immunizing peptide was included with the primary antibody in the immunoblotting procedure (FIG. 6 at F). siRNAs to Miro1 decreased signals for anti-Miro1 and anti-Miro1-AcK105, and blocking peptide reduced anti-Miro1-AcK105 immunofluorescent signals in axons. Thus, the anti-Miro1-AcK105 antibody is specific for acetylated Miro1 protein. Indeed, exposing DRG cultures to bath-applied aggrecan or increased intracellular [$Ca^{2+}$] with thapsigargin treatment decreased Miro1-AcK105 overall by immunoblotting (FIG. 6 at G and H) and in axons by immunofluorescence (FIG. 6 at I and J).

K105 Acetylation of Miro1 Supports Axon Growth on Nonpermissive Substrates and Decreases Sensitivity of Mitochondrial Transport to Elevated [$Ca^{2+}$]

$Ca^{2+}$ binding to Miro1's EF-hand (FIG. 6 at D) motifs causes its dissociation from motor proteins and attenuates mitochondrial transport (Lee and Lu, 2014). Thus, we considered whether acetylation at K105 might alter Miro1's sensitivity to $Ca^{2+}$. Replacement of two lysines in Miro1's EF-hand with glutamates (Miro-KK; FIG. 6 at D) renders the protein insensitive to this $Ca^{2+}$ effect (Fransson et al., 2006). To test the possibility that $Ca^{2+}$ sensitivity of Miro1 regulates axon growth, we compared responses to aggrecan for DRG neurons transfected with Miro-KK or WT Miro1. Miro-KK expression prevented the decrease in Mito-GFP recovery observed by FRAP assays in distal axons after bath-applied aggrecan (FIG. 7 at A). Miro-KK similarly rescued the decrease in $\Psi_M$ that was seen in axons of neurons cultured on substrate-bound aggrecan (FIG. 7 at B). Consistent with these effects on axonal mitochondria, axon length was significantly greater in Miro-KK-expressing DRGs cultured on aggrecan coated coverslips (FIG. 7 at C). However, similar to HDAC6 inhibition, axon growth was not affected on laminin (FIG. 7 at C). These data indicate that Miro1's sensitivity to $Ca^{2+}$, which determines Miro1's interaction with Milton and mitochondrial association with motor proteins (Lee and Lu, 2014), contributes to the CSPG dependent decrease in mitochondrial transport, $\Psi_M$, and axon growth.

FIG. 7 shows Acetylation of Miro1 on K105 increases mitochondrial transport and supports axon growth on CNS growth inhibitory substrates. (A) Endpoint FRAP analysis for Mito-GFP in distal axons of DRGs transfected with either Myc-Miro1 (WT) or Myc-Miro1KK (KK) plasmids and cultured on laminin ±bath-applied 10 µg/ml aggrecan (CSPG) is shown as average of normalized percentage recovery±SEM at 960 s after bleach (n≥16 axons over four culture preparations; ***, P≤0.005 vs. control+WT; ###, P≤0.005 vs. control+Miro1KK; ΔΔ, P≤0.01 vs. CSPG+WT by two-way ANOVA with Tukey post hoc). (B) Miro-KK expression prevents aggrecan-dependent decrease in axonal ΨMas evidenced by JC-1 fluorescence ratio for DRGs cultured on laminin-coated (Cntl) versus aggrecan-coated (CSPG) coverslips. Average ratio±SEM is shown (n=20; *, P≤0.05; *, P≤0.005 vs. control; ###, P≤0.005 vs. CSPG by one-way ANOVA with pairwise comparison and Tukey post hoc). (C) DRGs transfected as in B were cultured on laminin (Cntl) or aggrecan (CSPG) substrates. Axon length assessed at 72 h after transfection is shown as average total axon length/neuron±SEM (n≥95 each over three DRG cultures; *, P≤0.005 vs. control+WT; ###, P≤0.005 vs. control+Miro-KK; ΔΔ, P≤0.01 vs. CSPG+WT as determined by two-way ANOVA with Tukey post hoc). (D) FRAP analyses for Mito-GFP in distal axons of DRGs transfected with Myc-Miro1, Myc-Miro1K105Q, or Myc-Miro1K629Q and cultured on laminin and then ±bath-applied 10 µg/ml aggrecan (CSPG) are shown as average normalized percentage recovery±SEM (n≥9 axons over three culture preparations; **, P≤0.005 for indicated treatments by two-way ANOVA with Tukey honestly significant difference [HSD] post hoc). (E) Representative immunofluorescent images for Myc-Miro1 or Myc-Miro1K105Q (FITC) and NF (Cy5) along axons of cultured DRG neurons shows that both proteins localize to axons and co-localize with MitoTracker signals. (F) Percentage of moving axonal mitochondrial showing anterograde (blue) versus retrograde (red) directions in DRG neurons transfected with indicated Myc-tagged Miro1 constructs and plated on aggrecan (CSPG). Average values±SEM are shown. (G) Percentage of retrogradely (red) and anterogradely (blue) moving mitochondria in growth cone of rat adult DRG neurons expressing Myc-Miro1K105Q or Myc-Miro1K105A and mito-GFP when axons are exposed to CSPG-coated versus control BSA-coated microspheres. Average values±SEM are shown; *, P≤0.05 by one-way ANOVA with pairwise comparison and Tukey post hoc). (H) Axon growth on substrate-bound aggrecan (CSPG) for DRGs transfected with Miro1 WT, KK, or acetyl-mimetic mutants (K105Q and K629Q) plasmids is shown as average total axon length/neuron±SEM. Axon length was assessed at 72 h after transfection (n≥75 each over three DRG cultures; , P≤0.005 vs. WT; ###, P≤0.001 vs. Miro1KK and Miro1K105Q by two-way ANOVA with Tukey HSD post hoc). Myc-Miro-KK and Myc-Miro1K105Q are not statistically different. (I) Endpoint FRAP is shown for Mito-GFP GFP recovery in distal axons of DRGs transfected with either Miro1 K105Q or K629Q plasmids and cultured on laminin followed by treatment with 1 µM thapsigargin plus vehicle control (DMSO), or 10 µM TubA is shown as average of normalized percentage recovery±SEM at 960 s after bleach (n≥16 axons over four culture preparations; , P≤0.01 vs. Miro1K105Q control or Miro1K629Q control; ##, P≤0.01 vs. Miro1K105Q+TubA by two-way ANOVA with Tukey HSD post hoc).

To directly test how acetylation of Miro1 affects axonal responses to growth-inhibitory substrates, we generated Myctagged Miro1 acetyl-mimetic mutants with Gln at K105 and K629 (Myc-Miro1K105Q and Myc-Miro1K629Q, respectively). DRG neurons transfected with each construct showed that the WT and all of the mutant Myc-Miro1 proteins extend into axons and co-localize with mitochondria (FIG. 7 at E). By AP analyses, Myc-Miro1K105Q expression, but not Myc-Miro1 or Myc-Miro1K629Q, prevented the attenuation of mitochondrial transport seen with bath-applied CSPG (FIG. 7 at E). For DRG neurons grown on aggrecan-coated coverslips, Myc-Miro1K105Q expression prevented the net shift to a higher proportion of retrogradely moving axonal mitochondria than was seen with expression of Myc-Miro1, acetyl-mimetic Myc-Miro1K629Q, or the nonacetylatable Miro1 K-to-A mutants (Myc-Miro1K105A and Myc-Miro1K6298A , respectively; FIG. 7 at F). No significant changes were seen for mitochondrial movements when these neurons were cultured on the permissive substrate laminin, or for speed of transport when cultured on CSPG or laminin substrates. Applying aggrecan adsorbed onto microbeads (CSPG-beads) to DRG cultures enabled us to provide a focal source of CSPG exposure to axons versus cell bodies (Willis et al., 2007). Similar to bath application of aggrecan, the CSPG-beads decreased mitochondrial transport in DRG cultures, but only when the beads lay adjacent to axons and not the neuronal cell body, indicating that this HDAC-dependent change in mitochondrial transport requires axonal signaling. Expression of Myc-Miro1K105Q, but not Myc-Miro1 or Myc-Miro1K629Q, similarly prevented the decrease in mitochondrial transport from axonal CSGP stimulation (FIG. 7 at G). Interestingly, Myc-Miro1K105Q expression supported axon growth on aggrecan-coated coverslips for adult DRG neurons that was comparable to the MirolKK mutant, while no axon growth above control was seen with Myc-MirolK629Q expression (FIG. 7 at H). To directly test whether Miro1 K105 acetylation impacts the protein's sensitivity to elevated [$Ca^{2+}$], we treated Myc-Miro1K105Q-expressing and Myc-Miro1K629Q-expressing DRGs with thapsigargin to release ER $Ca^{2+}$ stores and assessed mito-GFP transport in distal axons. Axons of the Myc-Miro1K105Q-expressing DRG neurons showed significantly higher Mito-GFP fluorescence recovery than Myc-Miro1K629Q-expressing neurons (FIG. 7 at I). The Mito-GFP recovery for thapsigargin-treated cultures was significantly increased by TubA treatment in the Myc-Miro1K629Q-expressing neurons, but Myc-Miro1K105OQ-expressing neurons showed only a modest response to TubA treatment (FIG. 7 at I).

Discussion

We previously reported that inhibition of HDAC6 supports axon growth on nonpermissive substrates (Rivieccio et al., 2009), suggesting that the substrates of HDAC6 contribute to the growth inhibition from these stimuli. Although HDAC6 has nuclear functions (Verdel et al., 2000), this protein was identified as an α-tubulin deacetylase (Hubbert et al., 2002), and HDAC6 knockout mice show a generalized increase in Ac-α-tubulin levels in all tissues (Zhang et al., 2008). The deacetylation of axonal α-tubulin has generally been interpreted as responsible for HDAC6's effects on axon growth. However, we find that the outer mitochondrial membrane protein Miro1 is a substrate for HDAC6 in axons, with deacetylation of Miro1 K105 decreasing mitochondrial transport in axons and attenuating axon growth in response to CSPGs and MAG. Mitochondria play multiple roles in growing and mature axons by providing a source of ATP for energy needs and serving as a storage site for $Ca^{2+}$ (Smith and Gallo, 2018). Mitochondrial transport and function have been linked directly to axon growth, and Miro1 plays a critical role in kinesin- and dynein-dependent transport of mitochondria by linking these organelles to the motor proteins. Although Miro1's phosphorylation by PINK1 and subsequent ubiquitination by Parkin were shown to attenuate mitochondrial transport by targeting Miro1 for degradation (Birsa et al., 2014; Shlevkov et al., 2016), possible roles for acetylation of Miro1 and its effects on mitochondria have not previously been reported. Moreover, K105 for rat and mouse or K92 for human Miro1 do not correspond to any of the reported Miro1 ubiquitination sites (Kazlauskaite et al., 2014), suggesting that the mechanism for sustaining mitochondrial transport through Miro1 K105 acetylation is unlikely to be a simple prevention of ubiquitination.

The Gallo laboratory recently showed that CSPGs decrease mitochondrial motility in growth cones of chick DRG neurons (Sainath et al., 2017), and our data extend this to show that both MAG and CSPGs decrease mitochondrial transport and membrane potential in adult rat sensory axons. Moreover, we show that this alteration in mitochondrial motility is through a localized, axon-intrinsic mechanism that is overcome by expression of acetyl-mimetic Miro1. CNS growth inhibitors block axon growth in part through activating RhoA that is known to cause F-actin depolymerization (Fujita and Yamashita, 2014). These growth inhibitors are also known to increase intracellular $Ca^{2+}$ (Snow et al., 1994; Henley et al., 2004). Activation of RhoA has been shown to trigger release of intracellular $Ca^{2+}$ stores in fibroblasts (Lee et al., 1998), but it was not known if this occurs in neurons. By using a combination of a pharmacological RhoA activator, ROCK inhibitor, $Ca^{2+}$ chelator, and sarco/ER $Ca^{2+}$-ATPase (SERCA) inhibition, our data indicate that activation of RhoA by CSPG and MAG increases intracellular $Ca^{2+}$, with a subsequent $Ca^{2+}$-dependent activation of HDAC6 to deacetylate Miro1. The acetyl-mimetic Miro1K105Q prevents the decrease in mitochondrial transport and ΨM after CPSG exposure, by direct activation of RhoA and by direct elevations of cytoplasmic $Ca^{2+}$ through SERCA inhibition. Taken together, these functions for HDAC6 and Miro1-AcK105 downstream of CSPGs and MAG provide new mechanistic insight into axon-intrinsic effects of these CNS growth inhibitors beyond their effects on cytoskeleton.

The attenuation of mitochondrial transport seen with MAG and CSPG exposure is clearly $Ca^{2+}$ dependent, since $Ca^{2+}$ chelation with BAPTA-AM prevented the decrease in mitochondrial trafficking seen with these stimuli. Ca2+-binding to Miro proteins' EF-hands triggers release of mitochondria from kinesin interaction to attenuate anterograde mitochondrial transport (Saxton and Hollenbeck, 2012). The Miro/Milton complex also contributes to dynein-dependent mitochondrial transport (van Spronsen et al., 2013), so $Ca^{2+}$ binding to Miro could also affect retrograde mitochondrial transport. Consistent with this, Mito-GFP FRAP analyses on axon shafts show that MAG attenuated both anterograde and retrograde mitochondrial transport in axons. The link between increased axoplasmic $Ca^{2+}$ after exposure to CNS growth inhibitors and the decreased mitochondrial transport is supported by our experiments with the $Ca^{2+}$-resistant form of Miro1. This Miro-KK mutant prevented the CSPG dependent decrease in axonal mitochondrial transport and $\Psi_M$, as well as supported axon growth on aggrecan. The acetylmimetic Miro1$^{K105Q}$ equally rescues the effects of CSPGs on mitochondrial transport, $\Psi_M$, and axon growth. This indicates that acetylation on K105 could contribute to Miro1's $Ca^{2+}$ sensitivity or binding. Consistent with this, Miro1K105Q protected decrease in mitochondrial transport and ΨM when axoplasmic $Ca^{2+}$ was directly increased by inhibiting SERCA with thapsigargin. K105 is within Miro1's N-terminal GTPase domain rather than the $Ca^{2+}$ binding EF-hands. This domain of Miro1 is needed for both kinesin- and dynein-dependent mitochondrial transport in cortical neurons (Babic et al., 2015). Future work will be needed to determine if K105 acetylation alters the GTPase activity of Miro1 and how this might affect $Ca^{2+}$ binding/sensitivity of Miro1's EF-hands. Miro1 has recently been shown to interact with mitochondrial $Ca^{2+}$ uniporter protein, and this is needed for Miro1-dependent transport of mitochondria (Niescier et al., 2018). The balance of $Ca^{2+}$ levels in the mitochondrial matrix is needed for mitochondrial transport, as increased mitochondrial $Ca^{2+}$ generated through mitochondrial $Ca^{2+}$ uniporter attenuates mitochondrial transport (Chang et al., 2011). With Miro1$^{K105Q}$ preventing both the decrease in mitochondrial transport and $\Psi_M$ seen after treatment with thapsigargin, it is intriguing to speculate that the acetylation status of Miro1 may also help determine $Ca^{2+}$ levels in the mitochondrial matrix.

Mitochondria are the major source of ATP for the axon and play a critical role in $Ca^{2+}$ buffering (Lin and Sheng, 2015). Mitochondrial trafficking in axons has been linked to developmental growth of retinal ganglion cell (RGC) neurons, and increased axonal mitochondrial content correlated with increased developmental and regenerative growth capacity (Steketee et al., 2012; Cartoni et al., 2017). Mitochondrial motility in axons of cortical neurons progressively declines as their axons mature during development (Lewis et al., 2016). Expression of Syntaphilin, which provides $Ca^{2+}$-dependent docking of mitochondria along axons, increases with neuronal maturation, and depletion of Syntaphilin increases axon regeneration rates in the peripheral nervous system (PNS; Zhou et al., 2016). In contrast to the PNS, mature RGC axons in the optic nerve have low spontaneous regeneration and need to be coaxed to regenerate by activating growth programs exogenously (Benowitz et al., 2017). When optic nerve regeneration is activated by deletion of the phosphatase and tensin homolog, there is a commensurate increase in the mitochondrial protein Armcx1 that results in increased transport of mitochondria in RGC axons (Cartoni et al., 2016). Differences in the extracellular environment of the injured CNS versus PNS are one of the factors that allow PNS neurons to spontaneously regenerate. Thus, the rapid decrease in axonal mitochondrial motility that we see in the PNS neurons used here after exposure to MAG and CSGP likely contributes to the axon growth inhibition.

Inhibition of HDAC6 has been suggested as potential therapeutic intervention for neuropathic conditions. Axon degeneration from chemotherapy agents vincristine and cisplatin was prevented by pretreatment with HDAC6 inhibitors (Krukowski et al., 2017; Van Helleputte et al., 2018), and HDAC6 inhibition was shown to reverse axon transport deficits in Charcot Marie Tooth 2 neuropathy models caused by HSPB1 mutation and glycyl tRNA synthetase (GlyRS) mutations (d'Ydewalle et al., 2011; Benoy et al., 2018). In each of these models, axon protection was accompanied by an increase in Ac-α-tubulin levels, suggesting that the protective mechanism is through stabilization of microtubules. Indeed, the mutant GlyRS was shown to interact with HDAC6 and stimulate its activity to decrease Ac-G-tubulin levels (Mo et al., 2018). However, mitochondrial transport is also altered in many neuropathic disorders (Pareyson et al., 2015). Mitochondrial trafficking in axons also decreases in Alzheimer's and Huntington's disease models, and inhibition of HDAC6 can overcome these deficits (Dompierre et al., 2007; Kim et al., 2012), raising the possibility that the acetylation/deacetylation status of Miro1 may also contribute to neurodegeneration. Reversal of mitochondrial trafficking defects in axons of human stem cell-derived motor neurons expressing amyotrophic lateral sclerosis-causing FUS protein mutants has also recently been reported (Guo et al., 2017).

Ac-α-tubulin is associated with stabilized microtubules (Cambray-Deakin and Burgoyne, 1987; Baas and Black, 1990), which has been shown to provide preferential binding for Kinesin-1 (Ertiirk et al., 2007) that could effectively increase anterograde transport of mitochondria and other cargoes. However, our data show that acetylation of Miro1 on K105 results in increased movement of mitochondria in axons. This raises the distinct possibility that increased acetylation of Miro1 contributes to the protective effects of HDAC6 inhibitors in neuropathic and neurodegenerative disorders.

It should be noted that Lin et al. (2015) reported that inhibition of HDAC6 could attenuate axon growth on permissive substrates. They also reported that axon crossing from permissive (laminin) to nonpermissive (CSPG) substrates was decreased by inhibition of HDAC6 (Lin et al., 2015), which conflicts with our observations using bath-applied and substrate-bound aggrecan as well as with our previous work (Rivieccio et al., 2009). Differences in presentation of the inhibitory substrates may explain this discrepancy. Axons crossing a CSPG border as used by Lin et al. (2015) are indeed different from the soluble and CSPG-coated coverslips used here. Interestingly, the adult DRG cultures used here showed decreased axon growth in escalating gradients of CSPGs ("spot assays"; Tom et al., 2004) that was not prevented by HDAC6 inhibition (not depicted) Thus, there may be different axonal responses based on how the nonpermissive stimulus is presented. Nonetheless, our data emphasize that the effects on axon growth and mitochondrial transport are generated from signals within the axons.

In summary, the work here shows that CNS growth inhibitors decrease mitochondrial transport in axons through an axonintrinsic mechanism that is HDAC6 dependent and results in deacetylation of Miro1 K105. Acetyl-mimetic Miro1K105Q mutant supports growth on these growth inhibitors and prevent decreases in mitochondrial transport and ΨM seen after exposure. CSPGs were also recently shown to impair mitochondria/ER targeting into growth cones of embryonic chick sensory neurons, with an accompanying decrease in ΨM (Sainath et al., 2017). This targeting deficit was suggested to disrupt functional linkages between mitochondria and ER. Mitochondrial-associated ER membranes facilitate $Ca^{2+}$ and phospholipid exchange between the two organelles and contribute to their trafficking, including transport in axons (Paillusson et al., 2016). Disrupted mitochondrial trafficking and axonal mitochondrial-associated ER membranes were recently reported on expression of an amyotrophic lateral sclerosis-causing mutant of FUS in neurons (Guo et al., 2017). The altered $Ca^{2+}$ sensitivity of acetylated Miro1 raises the possibility that Miro1-Ac-K105 could impact the interactions of mitochondria with ER in axons. It is not clear which protein acetylates Miro1. As noted, we recently showed that αTAT1 is destabilized by activation of RhoA/ROCK signaling, and overexpression of αTAT1 supports axon growth on the nonpermissive substrates used here (Wong et al., 2018). Further work will be needed to determine if αTAT can acetylate Miro1, but our data clearly indicate that the balance of Miro1 acetylation and deacetylation can help to drive axon growth on nonpermissive substrates.

Materials and Methods

Animal Care and Use

All vertebrate animal experiments were performed under protocols approved by Institutional Animal Care and Use Committees of Drexel University, University of South Carolina, University of Michigan, Weill Cornell Medicine, or University College London-Institute of Neurology Ethics Committee under license from the UK Home Office in accordance with the Animals (Scientific Procedures) Act (1986). Male Sprague-Dawley rats (175-250 g) or female C57BL/6 mice (6-8 wk) were used for all experiments. Animals were killed using $CO_2$ asphyxiation per approved methods. L4-5 DRGs were rapidly removed for dissociated culture (see below).

For in vivo inhibition of HDAC6, the sciatic nerve of anesthetized adult rats was injected twice at mid-thigh level with 2 µl of 1.5 mM TubA on the right and 2 µl of DMSO (vehicle control) on the left (isofluorane inhalation was used for anesthesia). Nerve injection sites were separated by 2 mm. Animals were used for in vivo imaging of mitochondrial transport or killed 2 h after injection for harvesting sciatic nerves for EM analyses.

Primary Neuron Cultures

For primary culture of rat DRG neurons, L4-5 DRG were harvested in Hibernate-A medium (BrainBits) and then dissociated using type I collagenase (50 U/ml; Gibco) for 20 min at 37° C. and 5% CO2 (Twiss et al., 2000). Dissociated ganglia were cultured in complete medium containing 10% FetalPlex animal serum complex (Gemini), 1% N1 Supplement (Sigma-Aldrich), and 10 µM cytosine-arabinoside (Sigma-Aldrich) on laminin/poly-L-lysine-coated substrates. Mouse neurons were used for cultures in microfluidic devices. For these, all cervical, thoracic, and lumbar DRGs were collected and digested with collagenase (4 mg/ml, Worthington) and dispase (1 mg/ml; Sigma-Aldrich) for 45 min at 37° C. and 5% CO2; these cells were plated in DMEM/F12 and 10% FBS at 37° C. and 5% $CO_2$. 18-24-h DRG cultures were used for immunostaining and MitoTracker experiments. For transfection, neurons were cultured for 72 h after nucleofection and plating. DRGs were cultured on glass coverslips for immunostaining, glass-bottom 35-mm dishes (Wilco) for live-cell imaging, or microfluidic devices for selective treatment of axonal processes.

For inhibition of HDAC6, DRG cultures were treated with TubA (10 µM, reconstituted in DMSO; Rivieccio et al., 2009) for indicated durations. The same final concentration of DMSO was added to control cultures for all TubA experiments ("vehicle control"). MitoTracker Green (Invitrogen; M7514) was used to visualize mitochondria in DRG cultures; this was prepared according to manufacturer's instructions and used at 50 nM applied 30 min before imaging followed by two washes in fresh medium.

MAG or Aggrecan exposures were performed as bath application or on coated substrates. For bath application, dissociated DRGs were cultured for 48 h and treated with 25 µg/ml of MAG-Fc (R&D Systems; 538-MG), 25 µg/ml Fc control (R&D Systems; 110-HG), or 10 µg/ml of Aggrecan (Sigma-Aldrich; A1960) for 4 h. Cultures were pretreated with either $Ca^{2+}$ chelator BAPTA-AM (3 µM; Sigma-Aldrich; A1076), ROCK inhibitor Y27632 (10 µM; Sigma-Aldrich; SCM075), HDAC6 inhibitor TubA (10 µM; R&D Systems; 6270), Thapsigargin (1 µM; Sigma-Aldrich; T9033), Rho Activator II (1 µg/ml; Cytoskeleton; CNO3), or equivalent volume DMSO 30 min before MAG-Fc, Aggrecan, or controls. For substrate-bound experiments, adult DRGs were cultured on glass bottom dishes (Greiner) that were coated with 25 µg/ml Aggrecan in addition to the laminin/poly-D-lysine substrate.

For microfluidic experiments, adult mouse DRG neurons were cultured in compartmentalized chambers (Xona Microfluidics) to separate axons from cell bodies. Dissociated ganglia were seeded in the cell body compartment at a high density of $5 \times 10^5$ cells/10 µl until high axon density was observed in the axonal compartment ($\geq 42$ h). TubA or DMSO was then applied to the axonal compartment with and without preincubation with MAG (25 µg/ml) for 4 h. Mitochondria were labeled with MitoTracker Green (50 nM) as above.

DNA Constructs and Transfections

Mito-GFP construct (pABCb 10aa1-35-GFP; Addgene) was used as a mitochondrial marker (Graf et al., 2004). pMito-KR (Evrogen) was used to ablate mitochondria in growth cones and in some cases as a mitochondrial marker. Transfection with pTagBFP (Evrogen) was used to visualize axons and growth cones. The Myc-tagged Miro1 (WT) and Myc-Miro1E208K/E328K (Miro-KK) expression constructs were purchased from Addgene (plasmid 47888 and 47894, respectively). Quikchange site-directed mutagenesis kit (Agilent; 200521) was used to introduce point mutations into the Myc-Miro1 WT plasmid to generate the nonacetylatable (K to A) and acetyl-mimetic (K to Q) constructs. mCherry-tagged α-tubulin expression plasmids (WT, non-acetylatable K40A, acetyl-mimetic K40Q) were previously described (Lee et al., 2015).

DRG cultures were transfected using the Amaxa Nucleofector with basic neuron SCN Nucleofector Kit (Lonza) and analyzed by live-cell imaging 48-72 h later. SiRNAs for HDAC6 have been described previously (Rivieccio et al., 2009); these were transfected with DarmaFect3 (Dharmacon), and cells were analyzed in live-cell imaging as above. siRNAs used for Miro1 knockdown were: #1, 59-CAACAAACAUU CAACAAACAUUC-UAUUGAUAAGTA-39, and #2, 59-CCUGCAUGAAGU-CAAGCAAGAACAC-39 (Integrated DNA Technologies).

Generation of Anti-Miro1-AcK105 Antibody

Anti-Miro1-AcK105 polyclonal antibody was generated in rabbits by ProSCI. After collection of preimmune serum, each rabbit was immunized at 0, 2, and 4 wk with the rat Miro1 (SwissProt accession no. NP 001100496.1) Ac-Lys peptide, KHSIDK(Ac) VTSR (K105 in rat is corresponds to human K92), in complete Freund's adjuvant. Rabbits were boosted once intramuscularly at week 6 with peptide formulated in incomplete Freund's adjuvant. Bleeds were collected at weeks 5 and 7 for serum isolation and testing.

Antisera were initially tested using ELISA with all steps at room temperature and incubations in humidified chambers. For this, peptides, KHSIDK(Ac)VTSR versus KHSIDKVTSR (10 µg/ml per well in 100 µl of 50 mM carbonate buffer), were conjugated to 96-well plates. After 24-h incubation, plates were washed five times with distilled water and incubated for 2 h in blocking buffer (200 µl of 1% BSA and 0.02% thimerosal in PBS). Plates were washed twice with distilled water. 100 µl of serially diluted preimmune and immune sera in blocking buffer was added to wells (duplicate wells) for 2 h. Plates were washed three times using blocking buffer followed by three washes with distilled water. Each well was incubated with 100 µl of HRP-conjugated anti-rabbit secondary antibody diluted in blocking buffer for 2 h.

Plates were washed five times with blocking buffer, followed by five washes with distilled water. Plates were developed for 10 min in 100 µl of a 3,39,5,59-tetramethylbenzidine substrate solution. The reaction was stopped with 50 µl of 1 N HCL, and absorbance at 450 nm was read on a plate reader. For affinity purification, an immune-affinity chromatography column (5 ml) was prepared by cross-linking the KHSID-K(Ac)VTSR peptide to CNBr-activated sepharose 4B. Immune serum was centrifuged and filtered through a 0.45-µm filter. The immune-affinity purification column was washed with 50 ml of PBS. 5 ml serum was added, column ends were capped, and the column was rotated for 30 min. Caps were removed from the column to drain the serum, and the process was repeated until the rest of the serum was passed through the column.

The column was washed with 50 ml of PBS; bound antibody was eluted with 100 mM glycine buffer, pH 2.5; and 1-ml fractions were collected into tubes containing 50 µl of 1 M Tris, pH 9.5. The fractions containing the antibody were pooled, and the antibody was dialyzed using 12-14-kD dialysis tubing against three changes of PBS. NaN3 was added to the concentrated antibody solution for preservative (at 0.025%).

Immunoprecipitation

DRG neurons were lysed in 100 mM KCl, 5 mM MgCl2, 10 mM Hepes, pH 7.4, 1 mM DTT, and 0.5% NP-40 supplemented with 1× protease inhibitor cocktail (Roche). The lysates were passed through a 25-gauge needle five times and cleared by centrifugation at 12,000 g for 20 mM. Equal amounts of the supernatants were then incubated with primary antibodies overnight, and immunocomplexes were precipitated with Protein G-Dynabeads (Invitrogen) for an additional 2 h at 4° C. with rotation. A cocktail of rabbit and mouse anti-Ac-Lys antibodies (5 µg each; Cell Signaling; 9441 and 9681) was used directly for analyses of Myc-Miro1 transfected cultures by immunoprecipitation. For analysis of endogenous Miro1 acetylation, the anti-Lys antibody cocktail (5 µg of each) was directly cross-linked to 5 mg of M-270 epoxy beads (Dynabeads) using the Dynabeads antibody coupling kit according to the manufacturer's instructions (Life Technologies; 14311D). 100 µg of cleared lysates from DRG cultures were then incubated with the beads overnight at 4° C. with rotation. Beads were washed five times with cold lysis buffer, and immunocomplexes were released by boiling in Laemmli sample buffer and processed for immunoblotting as below.

Immunoblotting

For immunoblotting, protein lysates or immunoprecipitates were denatured by boiling in Laemmli sample buffer, fractionated by SDS-PAGE, and transferred to nitrocellulose membranes. Blots were blocked for 1 h at room temperature with 5% nonfat dry milk in TBS with 0.1% Tween 20 (TBST). Primary antibodies diluted in 5% BSA in TBST were added to the membranes and incubated overnight at 4° C. with rocking. Primary antibodies consisted of rabbit anti-Myc (1:2,000; Cell Signaling; 71D10), rabbit anti-RHOT1 antibody (1:1,000; Aviva Systems Biology; ARP44817 P050), rabbit anti-HDAC6 antibody (1:2,000; Cell Signaling; 7558), rabbit anti-ERK1 (1:5,000; Abcam; ab32537), and affinity-purified custom rabbit anti-Miro1-AcK105 (1:2,500; Twiss laboratory, see above) antibodies. For the anti-Miro1-AcK105 antibody, preimmune and testbleed sera were used at 1:1,000 dilutions to initially evaluate for specificity. After washing in TBST, blots were incubated with HRP-conjugated anti-rabbit IgG antibodies (1:5,000; Jackson Immunoresearch) diluted in blocking buffer for 1 h at room temperature. Signals were detected using ECL Prime (GE Healthcare) after extensive washing.

Immunofluorescence

Standard immunofluorescence methods were used as previously described (Merianda et al., 2009) at room temperature unless specified otherwise. Briefly, coverslips were rinsed in PBS, fixed in buffered 3.7% PFA for 15-20 min, and washed twice in PBS. Cultures were permeabilized with PBS plus 0.3% Triton X-100 (PBST; Sigma-Aldrich) for 5 min. Coverslips were blocked in 2% BSA and 2% FBS (Gemini) for 1 h. Coverslips were then incubated in the following primary antibodies overnight at 4° C. in 1% blocking buffer (Roche): chicken anti-NF cocktail (1:1,000; Ayes Lab; NFH, NFM, NFL), rabbit anti-HDAC6 antibody (1:200; Abcam; Ab12173), mouse anti-Ac-α-tubulin IgG (6-11-B1; Sigma-Aldrich; T7451), mouse 9B11 anti-myc (1:1,000; Cell Signaling; 2276), rabbit anti-Myc (1:300; Cell Signaling; 71D10), anti-Miro1. (1:200; Aviva Systems Biology; ARP44817 P050), and custom affinity-purified rabbit anti-Miro1-AcK105 (1:300; Twiss laboratory). After washes in PBST, coverslips were incubated with combinations of FITC-conjugated donkey anti-mouse IgG, Cy5-conjugated donkey anti-chicken IgG, and Cy3-conjugated donkey anti-rabbit IgG (1:200; Jackson Immunoresearch), for 1 h, and then washed twice with 1×PBS, rinsed with distilled H2O, and mounted with Prolong Gold Antifade with DAPI (Life Technologies).

We used a sequential immunostaining approach for simultaneous detection of tyrosinated α-tubulin (by indirect immunofluorescence), Ac-α-tubulin, and β-tubulin (by direct immunofluorescence). Phalloidin staining was also used to detect F-actin. Monoclonal mouse anti-Ac-α-tubulin IgG (6-11-B1; Sigma-Aldrich; T6793) was conjugated to Alexa Fluor 405 using the Zenon Labeling Kit per the manufacturer's instructions (Life Technologies; Z-25013). After fixation and permeabilization, coverslips were incubated with anti-Tyr-α-tubulin IgG (1:100; Sigma-Aldrich; T9028) in 1% blocking buffer overnight at 4° C. in a humidified chamber. Cells were washed three times in PBST and then incubated with Cy5-conjugated anti-mouse IgG (1:200; Jackson Immunoresearch) in 1% blocking buffer for 1 h. Cells were washed twice with PBST and then incubated with the Alexa Fluor 405-conjugated mouse 6-11-B1 anti-Ac-α-tubulin (1:50; Sigma-Aldrich; T6793) and FITC-conjugated Tub 2.1 mouse anti-β-tubulin IgG (1:50; Sigma-Aldrich; T4026) in 1% blocking buffer for 1.5 h. Coverslips were washed twice with PBS then stained with Actin-Red 555 Ready Probe for 30 min (1:25 dilution of 200 U/ml stock; Thermo Fisher Scientific; R37112). After rinsing with PBS and then distilled H2O, coverslips were mounted with Prolong Gold Antifade. Signals for tubulin and F-actin were verified as axonal by matching to channels merged with differential interference contrast (DIC) images. All imaging of immunolabeled samples was performed at room temperature. Epifluorescence and confocal imaging was used for imaging of fixed samples to obtain protein localization and quantitation data. Immunofluorescence and DIC were performed on a Leica DMI6000 M microscope fitted with a Hamamatsu ORCA R2 CCD camera (Hamamatsu) for epifluorescence; Leica HC PL Apo 63×/1.4 NA oil-immersion objectives were used for high-resolution imaging. Images were matched for acquisition parameters using Leica LAS-X software. Confocal imaging for immunofluorescence and DIC were performed on a Leica SP8X microscope (Leica DMI6000 M platform) fitted with a galvanometer Z stage and HyD detectors; HC PL Apo 63×/1.4 NA and HCX PL Apo 100×/1.4 NA objectives (both oil immersion) were used with acquisition parameters matched for individual experiments using LAS-X software. For some experiments as indicated in the figure legends, confocal images were deconvolved using the Leica Lightning software module. LAS-X software was used to generate XYZ projection images where indicated in figure legends.

Both epifluorescent and confocal images were acquired in monochrome; ImageJ (National Institutes of Health) was used for pseudocoloring, channel merging, and image cropping where indicated. For neurite outgrowth experiments, NF immunofluorescence and DIC imaging were performed with the Leica DM6000 M microscope as above (HCX PL FL 20×/0.50 NA objective; FIG. 1 A) or ImageXpress Micro high content imaging system (Molecular Devices) with Nikon Plan Fluor 10×/0.3 NA objective Photometrics Coolsnap HQ CCD camera (FIG. 4, D and F; and FIG. 7, C and H). Leica LAS-X acquisition software was used for merging tile scans into montage images from the DM6000 M microscope, and MetaExpress software was used for acquiring imaging and merging montage images on the ImageXpress Micro system.

EM

Sciatic nerves were fixed in 2% PFA and 2% glutaraldehyde in PBS overnight and then transferred to PBS. Sciatic nerve segments (±2 mm from injection site) were next processed for ultrastructural studies. The nerve segments were immersed in 1% solution of osmium tetroxide, dehydrated in a graded series of ethanol, and embedded in plastic resin using the Eponate 12™ Kit (Ted Pella). 0.5-μm-thick transverse sections from each nerve segment were cut and stained with toluidine blue for light microscopy. 60-90-nm-thick ultrathin sections were then cut using an RMC Products PowerTome ultramicrotome (Boeckeler Instruments) and collected using formvar-coated one-hole copper grids. All sections were contrasted using uranyl acetate and lead citrate solutions. The ultrathin sections were imaged using a JEOL 100CX transmission electron microscope.

Imaging and Analyses of In Vivo Axonal Mitochondria Transport

Sciatic nerves were exposed in live, isofluorane-anaesthetized animals (female C57BL6/J mice aged 41-42 d after birth) as previously reported (Gibbs et al., 2016; Sleigh and Schiavo, 2016). Briefly, 10-μl glass micropipettes (Drummond Scientific; 5-000-1001-X10) were pulled (Mohan et al., 2015) and used to inject 2 μl of 1.5 mM TubA or DMSO (Sigma-Aldrich; D2650) vehicle control in sterile saline (0.9% wt/vol) into the proximal aspect of the exposed sciatic nerve. 2 μM tetramethylrhodamine, ethyl ester, perchlorate (Thermo Fisher Scientific; T669), and 0.1% (wt/vol) bromophenol blue (Sigma-Aldrich; B5525) were included in the injected solution to label mitochondria and confirm successful injection beneath the perineurium, respectively.

Body temperature was maintained using a heat pad during surgery and drug incubation. Sciatic nerves were imaged from 20 to 90 min after injection using an inverted LSM 780 laser scanning microscope (Zeiss) Plan-Apochromat 63×/1.4 NA Oil DIC M27 objective within an environmental chamber prewarmed and set to 37° C. An area containing labeled axons was selected and imaged for 444-1,000 s at 100× digital zoom every ~4 s (1,024×1,024 pixels, 0.5-μs pixel dwell time, 1% laser power). Four animals were imaged per day (two per treatment). Image series were converted into AVI files, and mitochondrial dynamics were assessed using Kinetic Imaging Software. Mitochondria were included in analyses when they could be tracked for at least five consecutive frames. At least 10 mitochondria (mean of 49.1) across at least three axons (mean of 4.38) per animal were tracked, and all analyses were performed blinded to treatment.

Live-Cell Imaging

All time-lapse experiments on cultured neurons were imaged in complete medium (without phenol red) at 37° C., 5% $CO_2$, throughout the imaging sequences. Imaging was performed with Leica SP8X confocal microscope as above, with HC PL Apo CS2 40×/1.3 NA or HC PL Apo 63×/1.4 NA oil-immersion objectives and Leica LAS-X software for acquisition, for all experiments except those in the $\Psi_M$ analyses. A Leica LAS-X FRAP module was used for acquisition and initial analyses of FRAP image sequences. Temperature and $CO_2$ were maintained using an environmental enclosure for the DM 6000 M platform.

Microscope pinhole was set to 3 Airy units to ensure full-thickness laser exposure to the axon and acquisition of fluorescent emissions. A Zeiss Axio Observer.Z1 microscope fitted with Zeiss Axiocam 503 Mono camera was used for the microfluidic chambers analyzed. An HL PL Apo 63×/1.4 NA oil-immersion objective was used with Zeiss Zen Blue software for acquisition. For $\Psi_M$ analyses in cultured neurons, an ImageXpress Micro microscope was used as described above. ImageJ was used for pseudocoloring, channel merging, and cropping of images where indicated.

For mitochondrial motility assays in cultured neurons, L4-5 DRG cultures were incubated with MitoTracker Green as above; ROIs were then scanned every 10 s over 10 min. In some experiments, the same cells were imaged before and after addition of TubA. For this, no DMSO was added to control cultures (i.e., baseline imaging) to avoid doubling the DMSO concentrations with TubA exposure. Potential effects of DMSO were assessed in separate plates from the same culture experiment. For localized treatment of DRG axons with CSPGs, we used aggrecan-coated microspheres as previously described (Willis et al., 2007). Briefly, 10 µg/ml of Aggrecan (Sigma-Aldrich) was adsorbed to 4.5 µm Carboxylate Microspheres according to the manufacturer's instructions (Polysciences). Microspheres loaded with equivalent concentrations of BSA were used as controls. Microspheres were added to 36-h DRG cultures transfected with Mito-GFP. For time-lapse imaging, growth cones were selected in which microspheres were present within 10 µm. As a control, we selected neurons in which microspheres were present within 10 µm of the cell body, but no microspheres showed in the vicinity of the axon being imaged. Mitochondrial dynamics were monitored by confocal microscopy as above.

For mitochondrial ablation by CALI, DRG cultures expressing Mito-KR and BFP for 48 h were imaged with the same confocal microscope. Mito-KR was activated with an argon laser at 514 nm continuously for 30 s until there was no detectable signal (100% laser power). After activation, 50 µm of the distal axon shaft and the growth cone were imaged every 30 s over 16 min using 585- and 405-nm laser lines (13 and 15.3% power, respectively).

Mito-KR- and Mito-GFP-expressing DRG neurons were used for FRAP analyses at 48-72 h after transfection. To evaluate mitochondrial motility in Mito-KR-expressing neurons, Mito-KR signals were photobleached using continual exposure to an argon laser set at 594 nm for 30 s (100% laser power) The bleached ROI was then monitored for recovery using an argon laser set at 580 nm every 10 s over 16 min (13% laser power). For FRAP analyses with Mito-GFP, GFP signals were photobleached in a 50 µm ROI using an argon laser set at 488 nm every 10 s for 16 min (70% laser power). The same excitation was used for post-bleach imaging to assess recovery every 10 s for 16 min. For axon shaft FRAP experiments in Mito-GFP-expressing neurons, ROIs of ~50 µm in length (without branches) were imaged ≥100 µm proximal to the growth cone. Prebleach, bleach, and post-bleach sequences were the same as for Mito-GFP above. In all cases, neurons were imaged over 40 s or more to acquire baseline Mito-KR or Mito-GFP signals before photobleaching using an argon laser (580 nm at 13% power for Mito-KR and 488 nm at 31% power for Mito-GFP).

JC-1 (Life Technologies) was used for $\Psi_M$ measurements. For this, DRG cultures were equilibrated in culture medium with 3 mM JC-1 for 20 min at 37° C. Medium was replaced, and the cells were maintained at 37° C. in the high-content imaging system on which JC-1 fluorescent signals in green and red wavelengths were acquired. MetaExpress software (Molecular Devices) was used for image acquisition and generation of montage images.

Image Analyses

NF-stained cultures were used for neurite growth analyses. Only neurites ≥100 µm were considered in these analyses from randomly acquired tile scans using WIS-Neuromath (Rishal et al., 2013). Growth cones were distinguished by visualizing the termination of the compacted, parallel, NF-positive bundles in the distal axon shaft by immunofluorescence and by formation of distinct lamellipodia characteristic of the proximal growth cone from DIC images. The growth cone area was measured using ImageJ software from these annotated DIC images. For axon growth in the transfection experiments, images of 72-h DRG cultures were acquired using the ImageXpress Micro system. Axon morphology was visualized NF immunofluorescence, and transfected neurons were identified using Myc immunofluorescence.

Quantification of growth cone mitochondria was performed using high-magnification images from living neurons transfected with either Mito-KR or incubated with MitoTracker. The growth cone was identified by bright-field or DIC images. In the case of MAG-treated cultures in which axons showed retraction, the end bulbs were used for quantification. Only mitochondria that could be distinguished as a single mitochondrion were counted; if this was not possible, that growth cone was not included in the analysis. These measurements were performed by a blinded observer.

Vesicle trafficking was quantified using differential ImageJ Difference Tracker Plug-in (Andrews et al., 2010). 50-80-µm long unbranched axon segments at approximately the mid-region between growth cone and cell body were analyzed. Kymographs were generated using ImageJ Kymograph Plug-in. For analyses of axon retraction in the CALI experiment, the distance from the distal tip of the growth cone in the pre-CALI image sequence was used as the baseline (t=1 min). The distance between the growth tip at end of the post-CALI sequence and the pre-CALI baseline was measured using LAS-X software. Movement of ≥0.5 µm toward the axon shaft was counted as retracted. Fluorescence emission of the Mito-KR post-CALI was analyzed using ImageJ. For normalizing intensities across FRAP image sets, fluorescence intensity at each time point was scaled using the LAS-X FRAP module so that the residual fluorescence signal at t=0 min (post-bleach) was set at 0 and the prebleach intensity was set at 100% for each bleached ROI. For axon shaft FRAP analyses, each 50-µm bleached ROI was divided into four equal 10-µm bins, and the fluorescence intensity recovery was measured as described above. EMs at 1,900× and 4,800× magnification across the cross-sectional surface of each sciatic nerve were used for in vivo analyses of mitochondrial content. A minimum of 75 unmyelinated axons was analyzed for each nerve. All unmyelinated axons from each analyzed image were included for quantitative studies. The total number of mitochondria was determined in each unmyelinated axon in the field and was divided by the total number of unmyelinated axons for all subjects. $\Psi_M$ was determined by changes in JC-1 fluorescence. JC-1 exists either as a green fluorescent monomer at depolarized membrane potentials or as an orange-red fluorescent aggregate at hyperpolarized membrane potentials. Decrease in $\Psi_M$ leads to a decrease in fluorescent red-orange signal with a concomitant increase in green fluorescence, leading to lower values for the orange-red/green fluorescence ratio. $\Psi_M$ was determined as a ratio of orange-red fluorescence to green fluorescent signal. The red and green fluorescence signals in the axon shaft ROIs were determined for individual neurons using ImageJ. Regions next to the ROIs were measured to calculate the background fluorescence intensity for each channel, and the average background fluorescence intensity was subtracted from average fluorescence intensities of ROIs. For measuring JC-1 fluorescence in DRGs transfected with expression construct, following JC-1 live cell imaging, cells were fixed and stained with Myc and NF. The axon shaft ROIs used for measuring JC-1 fluorescence were determined by overlaying the JC-1 images with the Myc and NF images. Mitochondrial membrane potential for each ROI was calculated by dividing orange-red fluorescent signal by the green fluorescent signal. A minimum of 25 ROIs was used to calculate the mitochondrial membrane potential for each treatment group.

Statistical Analysis

Prism (GraphPad) or Kaleidagraph (Synergy) software was used for all analysis. Data distributions were assumed to be normal. Statistical tests used were (as indicated in each figure legends) one-way ANOVA with Bonferonni's post hoc correction (FIG. 1, A and C; FIG. 2, A and C; FIG. 3, C and D; two-way ANOVA with Tukey's post hoc correction (FIG. 4, A-F and H; FIG. 5; FIG. 6 A; FIG. 7, A, C, D, H, and I; ANOVA with Holm-Sidak's multiple comparisons (FIG. 2, D-F); two-tailed Student's t test (FIG. 6 B); and Student's t test using matched-pairs signed-rank test. For comparison of matched pairs across different experiments, one-way ANOVA with pairwise comparison and Tukey's post hoc tests was used (FIG. 6, G-I; FIG. 7, B, F, and G). Kolmogorov-Smirnov t test was used for comparing across pooled time point groups. P values <0.05 were considered significant.

```
                    Sequence Listings

<110>   University of South Carolina

<120>   Acetylation of Miro1

<130>   2033101.0000155

<140>   Unknown

<141>   2021-03-01

<150>   U.S. Provisional Application No. 63/016,343

<151>   2020-04-28

<160>   2

<170>   PatentIn

<210>   1

<211>   1215

<212>   PRTN

<213>   Homo sapiens

<221>   CDS

<222>   1...1215

<400>   1

Met Thr Ser Thr Gly Gln Asp Ser Thr Thr Thr Arg Gln Arg Arg Ser
1               5                   10                  15

Arg Gln Asn Pro Gln Ser Pro Pro Gln Asp Ser Ser Val Thr Ser Lys
                20                  25                  30

Arg Asn Ile Lys Lys Gly Ala Val Pro Arg Ser Ile Pro Asn Leu Ala
            35                  40                  45

Glu Val Lys Lys Lys Gly Lys Met Lys Lys Leu Gly Gln Ala Met Glu
    50                  55                  60

Glu Asp Leu Ile Val Gly Leu Gln Gly Met Asp Leu Asn Leu Glu Ala
65                  70                  75                  80

Glu Ala Leu Ala Gly Thr Gly Leu Val Leu Asp Glu Gln Leu Asn Glu
                85                  90                  95
```

```
Phe His Cys Leu Trp Asp Asp Ser Phe Pro Glu Gly Pro Glu Arg Leu
            100                 105                 110
His Ala Ile Lys Glu Gln Leu Ile Gln Glu Gly Leu Leu Asp Arg Cys
            115                 120                 125
Val Ser Phe Gln Ala Arg Phe Ala Glu Lys Glu Glu Leu Met Leu Val
            130                 135                 140
His Ser Leu Glu Tyr Ile Asp Leu Met Glu Thr Thr Gln Tyr Met Asn
145                 150                 155                 160
Glu Gly Glu Leu Arg Val Leu Ala Asp Thr Tyr Asp Ser Val Tyr Leu
                165                 170                 175
His Pro Asn Ser Tyr Ser Cys Ala Cys Leu Ala Ser Gly Ser Val Leu
            180                 185                 190
Arg Leu Val Asp Ala Val Leu Gly Ala Glu Ile Arg Asn Gly Met Ala
            195                 200                 205
Ile Ile Arg Pro Pro Gly His Ala Gln His Ser Leu Met Asp Gly
            210                 215                 220
Tyr Cys Met Phe Asn His Val Ala Val Ala Ala Arg Tyr Ala Gln Gln
225                 230                 235                 240
Lys His Arg Ile Arg Arg Val Leu Ile Val Asp Trp Asp Val His His
                245                 250                 255
Gly Gln Gly Thr Gln Phe Thr Phe Asp Gln Asp Pro Ser Val Leu Tyr
            260                 265                 270
Phe Ser Ile His Arg Tyr Glu Gln Gly Arg Phe Trp Pro His Leu Lys
            275                 280                 285
Ala Ser Asn Trp Ser Thr Thr Gly Phe Gly Gln Gly Gln Gly Tyr Thr
            290                 295                 300
Ile Asn Val Pro Trp Asn Gln Val Gly Met Arg Asp Ala Asp Tyr Ile
305                 310                 315                 320
Ala Ala Phe Leu His Val Leu Leu Pro Val Ala Leu Glu Phe Gln Pro
                325                 330                 335
Gln Leu Val Leu Val Ala Ala Gly Phe Asp Ala Leu Gln Gly Asp Pro
            340                 345                 350
Lys Gly Glu Met Ala Ala Thr Pro Ala Gly Phe Ala Gln Leu Thr His
            355                 360                 365
Leu Leu Met Gly Leu Ala Gly Gly Lys Leu Ile Leu Ser Leu Glu Gly
            370                 375                 380
Gly Tyr Asn Leu Arg Ala Leu Ala Glu Gly Val Ser Ala Ser Leu His
385                 390                 395                 400
Thr Leu Leu Gly Asp Pro Cys Pro Met Leu Glu Ser Pro Gly Ala Pro
                405                 410                 415
Cys Arg Ser Ala Gln Ala Ser Val Ser Cys Ala Leu Glu Ala Leu Glu
            420                 425                 430
Pro Phe Trp Glu Val Leu Val Arg Ser Thr Glu Thr Val Glu Arg Asp
            435                 440                 445
Asn Met Glu Glu Asp Asn Val Glu Glu Ser Glu Glu Gly Pro Trp
            450                 455                 460
Glu Pro Pro Val Leu Pro Ile Leu Thr Trp Pro Val Leu Gln Ser Arg
465                 470                 475                 480
Thr Gly Leu Val Tyr Asp Gln Asn Met Met Asn His Cys Asn Leu Trp
                485                 490                 495
```

| Sequence Listings |
|---|

Asp Ser His His Pro Glu Val Pro Gln Arg Ile Leu Arg Ile Met Cys
        500                 505                 510

Arg Leu Glu Glu Leu Gly Leu Ala Gly Arg Cys Leu Thr Leu Thr Pro
        515                 520                 525

Arg Pro Ala Thr Glu Ala Glu Leu Leu Thr Cys His Ser Ala Glu Tyr
        530                 535                 540

Val Gly His Leu Arg Ala Thr Glu Lys Met Lys Thr Arg Glu Leu His
545                 550                 555                 560

Arg Glu Ser Ser Asn Phe Asp Ser Ile Tyr Ile Cys Pro Ser Thr Phe
                565                 570                 575

Ala Cys Ala Gln Leu Ala Thr Gly Ala Ala Cys Arg Leu Val Glu Ala
        580                 585                 590

Val Leu Ser Gly Glu Val Leu Asn Gly Ala Ala Val Val Arg Pro Pro
        595                 600                 605

Gly His His Ala Glu Gln Asp Ala Ala Cys Gly Phe Cys Phe Phe Asn
        610                 615                 620

Ser Val Ala Val Ala Ala Arg His Ala Gln Thr Ile Ser Gly His Ala
625                 630                 635                 640

Leu Arg Ile Leu Ile Val Asp Trp Asp Val His His Gly Asn Gly Thr
                645                 650                 655

Gln His Met Phe Glu Asp Asp Pro Ser Val Leu Tyr Val Ser Leu His
                660                 665                 670

Arg Tyr Asp His Gly Thr Phe Phe Pro Met Gly Asp Glu Gly Ala Ser
        675                 680                 685

Ser Gln Ile Gly Arg Ala Ala Gly Thr Gly Phe Thr Val Asn Val Ala
        690                 695                 700

Trp Asn Gly Pro Arg Met Gly Asp Ala Asp Tyr Leu Ala Ala Trp His
705                 710                 715                 720

Arg Leu Val Leu Pro Ile Ala Tyr Glu Phe Asn Pro Glu Leu Val Leu
                725                 730                 735

Val Ser Ala Gly Phe Asp Ala Ala Arg Gly Asp Pro Leu Gly Gly Cys
        740                 745                 750

Gln Val Ser Pro Glu Gly Tyr Ala His Leu Thr His Leu Leu Met Gly
        755                 760                 765

Leu Ala Ser Gly Arg Ile Ile Leu Ile Leu Glu Gly Gly Tyr Asn Leu
        770                 775                 780

Thr Ser Ile Ser Glu Ser Met Ala Ala Cys Thr Arg Ser Leu Leu Gly
785                 790                 795                 800

Asp Pro Pro Pro Leu Leu Thr Leu Pro Arg Pro Pro Leu Ser Gly Ala
                805                 810                 815

Leu Ala Ser Ile Thr Glu Thr Ile Gln Val His Arg Arg Tyr Trp Arg
                820                 825                 830

Ser Leu Arg Val Met Lys Val Glu Asp Arg Glu Gly Pro Ser Ser Ser
        835                 840                 845

Lys Leu Val Thr Lys Lys Ala Pro Gln Pro Ala Lys Pro Arg Leu Ala
        850                 855                 860

Glu Arg Met Thr Thr Arg Glu Lys Lys Val Leu Glu Ala Gly Met Gly
865                 870                 875                 880

Lys Val Thr Ser Ala Ser Phe Gly Glu Glu Ser Thr Pro Gly Gln Thr
                885                 890                 895

-continued

Sequence Listings

Asn Ser Glu Thr Ala Val Val Ala Leu Thr Gln Asp Gln Pro Ser Glu
             900                 905                 910

Ala Ala Thr Gly Gly Ala Thr Leu Ala Gln Thr Ile Ser Glu Ala Ala
             915                 920                 925

Ile Gly Gly Ala Met Leu Gly Gln Thr Thr Ser Glu Glu Ala Val Gly
             930                 935                 940

Gly Ala Thr Pro Asp Gln Thr Thr Ser Glu Glu Thr Val Gly Gly Ala
945                  950                 955                 960

Ile Leu Asp Gln Thr Thr Ser Glu Asp Ala Val Gly Gly Ala Thr Leu
                 965                 970                 975

Gly Gln Thr Thr Ser Glu Glu Ala Val Gly Gly Ala Thr Leu Ala Gln
             980                 985                 990

Thr Thr Ser Glu Ala Ala Met Glu Gly Ala Thr Leu Asp Gln Thr Thr
             995                1000                1005

Ser Glu Glu Ala Pro Gly Gly Thr Glu Leu Ile Gln Thr Pro Leu
            1010                1015                1020

Ala Ser Ser Thr Asp His Gln Thr Pro Pro Thr Ser Pro Val Gln
            1025                1030                1035

Gly Thr Thr Pro Gln Ile Ser Pro Ser Thr Leu Ile Gly Ser Leu
            1040                1045                1050

Arg Thr Leu Glu Leu Gly Ser Glu Ser Gln Gly Ala Ser Glu Ser
            1055                1060                1065

Gln Ala Pro Gly Glu Glu Asn Leu Leu Gly Glu Ala Ala Gly Gly
            1070                1075                1080

Gln Asp Met Ala Asp Ser Met Leu Met Gln Gly Ser Arg Gly Leu
            1085                1090                1095

Thr Asp Gln Ala Ile Phe Tyr Ala Val Thr Pro Leu Pro Trp Cys
            1100                1105                1110

Pro His Leu Val Ala Val Cys Pro Ile Pro Ala Ala Gly Leu Asp
            1115                1120                1125

Val Thr Gln Pro Cys Gly Asp Cys Gly Thr Ile Gln Glu Asn Trp
            1130                1135                1140

Val Cys Leu Ser Cys Tyr Gln Val Tyr Cys Gly Arg Tyr Ile Asn
            1145                1150                1155

Gly His Met Leu Gln His His Gly Asn Ser Gly His Pro Leu Val
            1160                1165                1170

Leu Ser Tyr Ile Asp Leu Ser Ala Trp Cys Tyr Cys Gln Ala
            1175                1180                1185

Tyr Val His His Gln Ala Leu Leu Asp Val Lys Asn Ile Ala His
            1190                1195                1200

Gln Asn Lys Phe Gly Glu Asp Met Pro His Pro His
            1205                1210                1215

<210> 2

<211> 618

<212> PRTN

<213> *Homo sapiens*

<221> CDS

<222> 1...681

<400> 2

```
Met Lys Lys Asp Val Arg Ile Leu Leu Val Gly Glu Pro Arg Val Gly
1               5                   10                  15

Lys Thr Ser Leu Ile Met Ser Leu Val Ser Glu Glu Phe Pro Glu Glu
            20                  25                  30

Val Pro Pro Arg Ala Glu Glu Ile Thr Ile Pro Ala Asp Val Thr Pro
            35                  40                  45

Glu Arg Val Pro Thr His Ile Val Asp Tyr Ser Glu Ala Glu Gln Ser
        50                  55                  60

Asp Glu Gln Leu His Gln Glu Ile Ser Gln Ala Asn Val Ile Cys Ile
65                  70                  75                  80

Val Tyr Ala Val Asn Asn Lys His Ser Ile Asp Lys Val Thr Ser Arg
                85                  90                  95

Trp Ile Pro Leu Ile Asn Glu Arg Thr Asp Lys Asp Ser Arg Leu Pro
                100                 105                 110

Leu Ile Leu Val Gly Asn Lys Ser Asp Leu Val Glu Tyr Ser Ser Met
            115                 120                 125

Glu Thr Ile Leu Pro Ile Met Asn Gln Tyr Thr Glu Ile Glu Thr Cys
130                 135                 140

Val Glu Cys Ser Ala Lys Asn Leu Lys Asn Ile Ser Glu Leu Phe Tyr
145                 150                 155                 160

Tyr Ala Gln Lys Ala Val Leu His Pro Thr Gly Pro Leu Tyr Cys Pro
                165                 170                 175

Glu Glu Lys Glu Met Lys Pro Ala Cys Ile Lys Ala Leu Thr Arg Ile
            180                 185                 190

Phe Lys Ile Ser Asp Gln Asp Asn Asp Gly Thr Leu Asn Asp Ala Glu
            195                 200                 205

Leu Asn Phe Phe Gln Arg Ile Cys Phe Asn Thr Pro Leu Ala Pro Gln
        210                 215                 220

Ala Leu Glu Asp Val Lys Asn Val Val Arg Lys His Ile Ser Asp Gly
225                 230                 235                 240

Val Ala Asp Ser Gly Leu Thr Leu Lys Gly Phe Leu Phe Leu His Thr
                245                 250                 255

Leu Phe Ile Gln Arg Gly Arg His Glu Thr Thr Trp Thr Val Leu Arg
            260                 265                 270

Arg Phe Gly Tyr Asp Asp Asp Leu Asp Leu Thr Pro Glu Tyr Leu Phe
            275                 280                 285

Pro Leu Leu Lys Ile Pro Pro Asp Cys Thr Thr Glu Leu Asn His His
        290                 295                 300

Ala Tyr Leu Phe Leu Gln Ser Thr Phe Asp Lys His Asp Leu Asp Arg
305                 310                 315                 320

Asp Cys Ala Leu Ser Pro Asp Glu Leu Lys Asp Leu Phe Lys Val Phe
                325                 330                 335

Pro Tyr Ile Pro Trp Gly Pro Asp Val Asn Asn Thr Val Cys Thr Asn
            340                 345                 350

Glu Arg Gly Trp Ile Thr Tyr Gln Gly Phe Leu Ser Gln Trp Thr Leu
            355                 360                 365

Thr Thr Tyr Leu Asp Val Gln Arg Cys Leu Glu Tyr Leu Gly Tyr Leu
        370                 375                 380

Gly Tyr Ser Ile Leu Thr Glu Gln Glu Ser Gln Ala Ser Ala Val Thr
385                 390                 395                 400
```

```
Val Thr Arg Asp Lys Lys Ile Asp Leu Gln Lys Lys Gln Thr Gln Arg
                405                 410                 415

Asn Val Phe Arg Cys Asn Val Ile Gly Val Lys Asn Cys Gly Lys Ser
            420                 425                 430

Gly Val Leu Gln Ala Leu Leu Gly Arg Asn Leu Met Arg Gln Lys Lys
            435                 440                 445

Ile Arg Glu Asp His Lys Ser Tyr Tyr Ala Ile Asn Thr Val Tyr Val
        450                 455                 460

Tyr Gly Gln Glu Lys Tyr Leu Leu Leu His Asp Ile Ser Glu Ser Glu
465                 470                 475                 480

Phe Leu Thr Glu Ala Glu Ile Ile Cys Asp Val Val Cys Leu Val Tyr
                485                 490                 495

Asp Val Ser Asn Pro Lys Ser Phe Glu Tyr Cys Ala Arg Ile Phe Lys
            500                 505                 510

Gln His Phe Met Asp Ser Arg Ile Pro Cys Leu Ile Val Ala Ala Lys
            515                 520                 525

Ser Asp Leu His Glu Val Lys Gln Glu Tyr Ser Ile Ser Pro Thr Asp
    530                 535                 540

Phe Cys Arg Lys His Lys Met Pro Pro Pro Gln Ala Phe Thr Cys Asn
545                 550                 555                 560

Thr Ala Asp Ala Pro Ser Lys Asp Ile Phe Val Lys Leu Thr Thr Met
                565                 570                 575

Ala Met Tyr Pro His Val Thr Gln Ala Asp Leu Lys Ser Ser Thr Phe
            580                 585                 590

Trp Leu Arg Ala Ser Phe Gly Ala Thr Val Phe Ala Val Leu Gly Phe
            595                 600                 605

Ala Met Tyr Lys Ala Leu Leu Lys Gln Arg
    610                 615
```

Various modifications and variations of the described methods and compositions of the disclosure will be apparent to those skilled in the art without departing from the scope and spirit of the disclosure. Although the disclosure has been described in connection with specific embodiments, it will be understood that it is capable of further modifications and that the disclosure as claimed should not be unduly limited to such specific embodiments. Indeed, various modifications of the described modes for carrying out the disclosure that are obvious to those skilled in the art are intended to be within the scope of the disclosure. This application is intended to cover any variations, uses, or adaptations of the disclosure following, in general, the principles of the disclosure and including such departures from the present disclosure come within known customary practice within the art to which the disclosure pertains and may be applied to the essential features herein before set forth.

```
                        SEQUENCE LISTING

<160> NUMBER OF SEQ ID NOS: 2

<210> SEQ ID NO 1
<211> LENGTH: 1215
<212> TYPE: PRT
<213> ORGANISM: Homo sapiens

<400> SEQUENCE: 1

Met Thr Ser Thr Gly Gln Asp Ser Thr Thr Arg Gln Arg Arg Ser
1               5                   10                  15

Arg Gln Asn Pro Gln Ser Pro Pro Gln Asp Ser Ser Val Thr Ser Lys
            20                  25                  30

Arg Asn Ile Lys Lys Gly Ala Val Pro Arg Ser Ile Pro Asn Leu Ala
        35                  40                  45
```

```
Glu Val Lys Lys Gly Lys Met Lys Lys Leu Gly Gln Ala Met Glu
         50                  55                  60

Glu Asp Leu Ile Val Gly Leu Gln Gly Met Asp Leu Asn Leu Glu Ala
65                      70                  75                  80

Glu Ala Leu Ala Gly Thr Gly Leu Val Leu Asp Glu Gln Leu Asn Glu
                    85                  90                  95

Phe His Cys Leu Trp Asp Asp Ser Phe Pro Glu Gly Pro Glu Arg Leu
                100                 105                 110

His Ala Ile Lys Glu Gln Leu Ile Gln Glu Gly Leu Leu Asp Arg Cys
                115                 120                 125

Val Ser Phe Gln Ala Arg Phe Ala Glu Lys Glu Leu Met Leu Val
        130                 135                 140

His Ser Leu Glu Tyr Ile Asp Leu Met Glu Thr Thr Gln Tyr Met Asn
145                 150                 155                 160

Glu Gly Glu Leu Arg Val Leu Ala Asp Thr Tyr Asp Ser Val Tyr Leu
                165                 170                 175

His Pro Asn Ser Tyr Ser Cys Ala Cys Leu Ala Ser Gly Ser Val Leu
                180                 185                 190

Arg Leu Val Asp Ala Val Leu Gly Ala Glu Ile Arg Asn Gly Met Ala
        195                 200                 205

Ile Ile Arg Pro Pro Gly His His Ala Gln His Ser Leu Met Asp Gly
210                 215                 220

Tyr Cys Met Phe Asn His Val Ala Val Ala Ala Arg Tyr Ala Gln Gln
225                 230                 235                 240

Lys His Arg Ile Arg Arg Val Leu Ile Val Asp Trp Asp Val His His
                245                 250                 255

Gly Gln Gly Thr Gln Phe Thr Phe Asp Gln Asp Pro Ser Val Leu Tyr
                260                 265                 270

Phe Ser Ile His Arg Tyr Glu Gln Gly Arg Phe Trp Pro His Leu Lys
        275                 280                 285

Ala Ser Asn Trp Ser Thr Thr Gly Phe Gly Gln Gly Gln Gly Tyr Thr
        290                 295                 300

Ile Asn Val Pro Trp Asn Gln Val Gly Met Arg Asp Ala Asp Tyr Ile
305                 310                 315                 320

Ala Ala Phe Leu His Val Leu Leu Pro Val Ala Leu Glu Phe Gln Pro
                325                 330                 335

Gln Leu Val Leu Val Ala Ala Gly Phe Asp Ala Leu Gln Gly Asp Pro
                340                 345                 350

Lys Gly Glu Met Ala Ala Thr Pro Ala Gly Phe Ala Gln Leu Thr His
        355                 360                 365

Leu Leu Met Gly Leu Ala Gly Gly Lys Leu Ile Leu Ser Leu Glu Gly
        370                 375                 380

Gly Tyr Asn Leu Arg Ala Leu Ala Glu Gly Val Ser Ala Ser Leu His
385                 390                 395                 400

Thr Leu Leu Gly Asp Pro Cys Pro Met Leu Glu Ser Pro Gly Ala Pro
                405                 410                 415

Cys Arg Ser Ala Gln Ala Ser Val Ser Cys Ala Leu Glu Ala Leu Glu
                420                 425                 430

Pro Phe Trp Glu Val Leu Val Arg Ser Thr Glu Thr Val Glu Arg Asp
        435                 440                 445

Asn Met Glu Glu Asp Asn Val Glu Glu Ser Glu Glu Gly Pro Trp
        450                 455                 460
```

```
Glu Pro Pro Val Leu Pro Ile Leu Thr Trp Pro Val Leu Gln Ser Arg
465                 470                 475                 480

Thr Gly Leu Val Tyr Asp Gln Asn Met Met Asn His Cys Asn Leu Trp
            485                 490                 495

Asp Ser His His Pro Glu Val Pro Gln Arg Ile Leu Arg Ile Met Cys
        500                 505                 510

Arg Leu Glu Glu Leu Gly Leu Ala Gly Arg Cys Leu Thr Leu Thr Pro
    515                 520                 525

Arg Pro Ala Thr Glu Ala Glu Leu Leu Thr Cys His Ser Ala Glu Tyr
530                 535                 540

Val Gly His Leu Arg Ala Thr Glu Lys Met Lys Thr Arg Glu Leu His
545             550                 555                 560

Arg Glu Ser Ser Asn Phe Asp Ser Ile Tyr Ile Cys Pro Ser Thr Phe
                565                 570                 575

Ala Cys Ala Gln Leu Ala Thr Gly Ala Ala Cys Arg Leu Val Glu Ala
            580                 585                 590

Val Leu Ser Gly Glu Val Leu Asn Gly Ala Ala Val Val Arg Pro Pro
            595                 600                 605

Gly His His Ala Glu Gln Asp Ala Ala Cys Gly Phe Cys Phe Phe Asn
        610                 615                 620

Ser Val Ala Val Ala Ala Arg His Ala Gln Thr Ile Ser Gly His Ala
625                 630                 635                 640

Leu Arg Ile Leu Ile Val Asp Trp Asp Val His His Gly Asn Gly Thr
                645                 650                 655

Gln His Met Phe Glu Asp Asp Pro Ser Val Leu Tyr Val Ser Leu His
        660                 665                 670

Arg Tyr Asp His Gly Thr Phe Phe Pro Met Gly Asp Glu Gly Ala Ser
            675                 680                 685

Ser Gln Ile Gly Arg Ala Ala Gly Thr Gly Phe Thr Val Asn Val Ala
    690                 695                 700

Trp Asn Gly Pro Arg Met Gly Asp Ala Asp Tyr Leu Ala Ala Trp His
705                 710                 715                 720

Arg Leu Val Leu Pro Ile Ala Tyr Glu Phe Asn Pro Glu Leu Val Leu
                725                 730                 735

Val Ser Ala Gly Phe Asp Ala Ala Arg Gly Asp Pro Leu Gly Gly Cys
            740                 745                 750

Gln Val Ser Pro Glu Gly Tyr Ala His Leu Thr His Leu Leu Met Gly
    755                 760                 765

Leu Ala Ser Gly Arg Ile Ile Leu Ile Leu Glu Gly Gly Tyr Asn Leu
    770                 775                 780

Thr Ser Ile Ser Glu Ser Met Ala Ala Cys Thr Arg Ser Leu Leu Gly
785                 790                 795                 800

Asp Pro Pro Pro Leu Leu Thr Leu Pro Arg Pro Pro Leu Ser Gly Ala
            805                 810                 815

Leu Ala Ser Ile Thr Glu Thr Ile Gln Val His Arg Arg Tyr Trp Arg
            820                 825                 830

Ser Leu Arg Val Met Lys Val Glu Asp Arg Glu Gly Pro Ser Ser Ser
            835                 840                 845

Lys Leu Val Thr Lys Lys Ala Pro Gln Pro Ala Lys Pro Arg Leu Ala
    850                 855                 860

Glu Arg Met Thr Thr Arg Glu Lys Lys Val Leu Glu Ala Gly Met Gly
865                 870                 875                 880

Lys Val Thr Ser Ala Ser Phe Gly Glu Glu Ser Thr Pro Gly Gln Thr
```

```
                    885                 890                 895
Asn Ser Glu Thr Ala Val Val Ala Leu Thr Gln Asp Gln Pro Ser Glu
                900                 905                 910

Ala Ala Thr Gly Gly Ala Thr Leu Ala Gln Thr Ile Ser Glu Ala Ala
            915                 920                 925

Ile Gly Gly Ala Met Leu Gly Gln Thr Thr Ser Glu Glu Ala Val Gly
        930                 935                 940

Gly Ala Thr Pro Asp Gln Thr Thr Ser Glu Glu Thr Val Gly Gly Ala
945                 950                 955                 960

Ile Leu Asp Gln Thr Thr Ser Glu Asp Ala Val Gly Gly Ala Thr Leu
                965                 970                 975

Gly Gln Thr Thr Ser Glu Glu Ala Val Gly Gly Ala Thr Leu Ala Gln
            980                 985                 990

Thr Thr Ser Glu Ala Ala Met Glu Gly Ala Thr Leu Asp Gln Thr Thr
        995                 1000                1005

Ser Glu Glu Ala Pro Gly Gly Thr Glu Leu Ile Gln Thr Pro Leu
    1010                1015                1020

Ala Ser Ser Thr Asp His Gln Thr Pro Pro Thr Ser Pro Val Gln
    1025                1030                1035

Gly Thr Thr Pro Gln Ile Ser Pro Ser Thr Leu Ile Gly Ser Leu
    1040                1045                1050

Arg Thr Leu Glu Leu Gly Ser Glu Ser Gln Gly Ala Ser Glu Ser
    1055                1060                1065

Gln Ala Pro Gly Glu Glu Asn Leu Leu Gly Glu Ala Ala Gly Gly
    1070                1075                1080

Gln Asp Met Ala Asp Ser Met Leu Met Gln Gly Ser Arg Gly Leu
    1085                1090                1095

Thr Asp Gln Ala Ile Phe Tyr Ala Val Thr Pro Leu Pro Trp Cys
    1100                1105                1110

Pro His Leu Val Ala Val Cys Pro Ile Pro Ala Ala Gly Leu Asp
    1115                1120                1125

Val Thr Gln Pro Cys Gly Asp Cys Gly Thr Ile Gln Glu Asn Trp
    1130                1135                1140

Val Cys Leu Ser Cys Tyr Gln Val Tyr Cys Gly Arg Tyr Ile Asn
    1145                1150                1155

Gly His Met Leu Gln His His Gly Asn Ser Gly His Pro Leu Val
    1160                1165                1170

Leu Ser Tyr Ile Asp Leu Ser Ala Trp Cys Tyr Tyr Cys Gln Ala
    1175                1180                1185

Tyr Val His His Gln Ala Leu Leu Asp Val Lys Asn Ile Ala His
    1190                1195                1200

Gln Asn Lys Phe Gly Glu Asp Met Pro His Pro His
    1205                1210                1215

<210> SEQ ID NO 2
<211> LENGTH: 618
<212> TYPE: PRT
<213> ORGANISM: Homo sapiens

<400> SEQUENCE: 2

Met Lys Lys Asp Val Arg Ile Leu Leu Val Gly Glu Pro Arg Val Gly
1               5                   10                  15

Lys Thr Ser Leu Ile Met Ser Leu Val Ser Glu Glu Phe Pro Glu Glu
                20                  25                  30
```

-continued

Val Pro Pro Arg Ala Glu Glu Ile Thr Ile Pro Ala Asp Val Thr Pro
 35                  40                  45

Glu Arg Val Pro Thr His Ile Val Asp Tyr Ser Glu Ala Glu Gln Ser
 50                  55                  60

Asp Glu Gln Leu His Gln Glu Ile Ser Gln Ala Asn Val Ile Cys Ile
 65                  70                  75                  80

Val Tyr Ala Val Asn Asn Lys His Ser Ile Asp Lys Val Thr Ser Arg
                 85                  90                  95

Trp Ile Pro Leu Ile Asn Glu Arg Thr Asp Lys Asp Ser Arg Leu Pro
                100                 105                 110

Leu Ile Leu Val Gly Asn Lys Ser Asp Leu Val Glu Tyr Ser Ser Met
                115                 120                 125

Glu Thr Ile Leu Pro Ile Met Asn Gln Tyr Thr Glu Ile Glu Thr Cys
 130                 135                 140

Val Glu Cys Ser Ala Lys Asn Leu Lys Asn Ile Ser Glu Leu Phe Tyr
145                 150                 155                 160

Tyr Ala Gln Lys Ala Val Leu His Pro Thr Gly Pro Leu Tyr Cys Pro
                165                 170                 175

Glu Glu Lys Glu Met Lys Pro Ala Cys Ile Lys Ala Leu Thr Arg Ile
                180                 185                 190

Phe Lys Ile Ser Asp Gln Asp Asn Asp Gly Thr Leu Asn Asp Ala Glu
                195                 200                 205

Leu Asn Phe Phe Gln Arg Ile Cys Phe Asn Thr Pro Leu Ala Pro Gln
210                 215                 220

Ala Leu Glu Asp Val Lys Asn Val Val Arg Lys His Ile Ser Asp Gly
225                 230                 235                 240

Val Ala Asp Ser Gly Leu Thr Leu Lys Gly Phe Leu Phe Leu His Thr
                245                 250                 255

Leu Phe Ile Gln Arg Gly Arg His Glu Thr Thr Trp Thr Val Leu Arg
                260                 265                 270

Arg Phe Gly Tyr Asp Asp Asp Leu Asp Leu Thr Pro Glu Tyr Leu Phe
                275                 280                 285

Pro Leu Leu Lys Ile Pro Pro Asp Cys Thr Thr Glu Leu Asn His His
290                 295                 300

Ala Tyr Leu Phe Leu Gln Ser Thr Phe Asp Lys His Asp Leu Asp Arg
305                 310                 315                 320

Asp Cys Ala Leu Ser Pro Asp Glu Leu Lys Asp Leu Phe Lys Val Phe
                325                 330                 335

Pro Tyr Ile Pro Trp Gly Pro Asp Val Asn Asn Thr Val Cys Thr Asn
                340                 345                 350

Glu Arg Gly Trp Ile Thr Tyr Gln Gly Phe Leu Ser Gln Trp Thr Leu
                355                 360                 365

Thr Thr Tyr Leu Asp Val Gln Arg Cys Leu Glu Tyr Leu Gly Tyr Leu
370                 375                 380

Gly Tyr Ser Ile Leu Thr Glu Gln Glu Ser Gln Ala Ser Ala Val Thr
385                 390                 395                 400

Val Thr Arg Asp Lys Lys Ile Asp Leu Gln Lys Gln Thr Gln Arg
                405                 410                 415

Asn Val Phe Arg Cys Asn Val Ile Gly Val Lys Asn Cys Gly Lys Ser
                420                 425                 430

Gly Val Leu Gln Ala Leu Leu Gly Arg Asn Leu Met Arg Gln Lys Lys
                435                 440                 445

Ile Arg Glu Asp His Lys Ser Tyr Tyr Ala Ile Asn Thr Val Tyr Val

-continued

```
                450                 455                 460
Tyr Gly Gln Glu Lys Tyr Leu Leu His Asp Ile Ser Glu Ser Glu
465                 470                 475                 480

Phe Leu Thr Glu Ala Glu Ile Ile Cys Asp Val Val Cys Leu Val Tyr
                485                 490                 495

Asp Val Ser Asn Pro Lys Ser Phe Glu Tyr Cys Ala Arg Ile Phe Lys
                500                 505                 510

Gln His Phe Met Asp Ser Arg Ile Pro Cys Leu Ile Val Ala Ala Lys
            515                 520                 525

Ser Asp Leu His Glu Val Lys Gln Glu Tyr Ser Ile Ser Pro Thr Asp
            530                 535                 540

Phe Cys Arg Lys His Lys Met Pro Pro Pro Gln Ala Phe Thr Cys Asn
545                 550                 555                 560

Thr Ala Asp Ala Pro Ser Lys Asp Ile Phe Val Lys Leu Thr Thr Met
                565                 570                 575

Ala Met Tyr Pro His Val Thr Gln Ala Asp Leu Lys Ser Ser Thr Phe
            580                 585                 590

Trp Leu Arg Ala Ser Phe Gly Ala Thr Val Phe Ala Val Leu Gly Phe
            595                 600                 605

Ala Met Tyr Lys Ala Leu Leu Lys Gln Arg
            610                 615
```

What is claimed is:

1. A method for supporting axon growth comprising:
   administering an effective amount of acetyl-Miro1, comprising SEQ. ID NO. 2, to the dorsal root ganglion and/or sciatic nerve of a subject;
   inhibiting histone deacetylase 6 (HDAC6) having SEQ. ID. NO. 1, via administering tubastatin (TubA) to axons, thereby sustaining mitochondrial support and mitochondrial membrane potential in a presence of CNS axon growth inhibitors; and
   wherein supporting axon growth occurs in adult dorsal root ganglion of the subject.

2. The method of claim 1, wherein administering acetyl-Miro1 and inhibiting HDAC6 prevent decreased mitochondrial transport in axons caused by released $Ca^{2+}$.

* * * * *